United States Patent
Andreoli-Fang et al.

(10) Patent No.: US 11,910,414 B2
(45) Date of Patent: *Feb. 20, 2024

(54) TECHNIQUES FOR WIRELESS ACCESS AND WIRELINE NETWORK INTEGRATION

(71) Applicant: Cisco Technology, Inc., San Jose, CA (US)

(72) Inventors: Jennifer Andreoli-Fang, Boulder, CO (US); John T. Chapman, Orange, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,605

(22) Filed: Dec. 29, 2021

(65) Prior Publication Data

US 2022/0124749 A1 Apr. 21, 2022

Related U.S. Application Data

(63) Continuation of application No. 16/871,087, filed on May 11, 2020, now Pat. No. 11,252,742, which is a
(Continued)

(51) Int. Cl.
*H04W 72/52* (2023.01)
*H04L 12/46* (2006.01)
(Continued)

(52) U.S. Cl.
CPC ......... *H04W 72/52* (2023.01); *H04L 12/2801* (2013.01); *H04L 12/4625* (2013.01); *H04W 28/0278* (2013.01); *H04W 84/045* (2013.01)

(58) Field of Classification Search
CPC ........... H04W 72/1252; H04W 84/045; H04W 28/0278; H04L 12/2801; H04L 12/4625
See application file for complete search history.

(56) References Cited

U.S. PATENT DOCUMENTS 9,820,331 B1 11/2017 Singh et al.
10,652,917 B2 * 5/2020 Andreoli-Fang ........................... H04W 72/1252
(Continued)

FOREIGN PATENT DOCUMENTS

| EP | 1214807 A1 | 6/2002 |
|---|---|---|
| EP | 2560323 A1 | 2/2013 |
| WO | 0119005 A1 | 3/2001 |

OTHER PUBLICATIONS

CISCO.com: "Cisco Visual Networking Index: Global Mobile Data Traffic Forecast Update, 2016-2021 White Paper", 2017 (9pgs.).
(Continued)

*Primary Examiner* — Justin T Van Roie
(74) *Attorney, Agent, or Firm* — Merchant & Gould P.C.

(57) ABSTRACT

One embodiment is a method and includes receiving at a termination element of a first network a bandwidth report ("BWR"), in which the BWR includes information regarding a data transmission opportunity over a second network for at least one endpoint data; scheduling a first network transmission opportunity for the at least one endpoint data using information derived from the received BWR; and receiving from a first network forwarding device the at least one endpoint data in accordance with the scheduled first network transmission opportunity.

20 Claims, 19 Drawing Sheets

Related U.S. Application Data continuation of application No. 15/456,115, filed on Mar. 10, 2017, now Pat. No. 10,652,917.

(60) Provisional application No. 62/443,105, filed on Jan. 6, 2017, provisional application No. 62/405,683, filed on Oct. 7, 2016, provisional application No. 62/405,686, filed on Oct. 7, 2016, provisional application No. 62/362,033, filed on Jul. 13, 2016, provisional application No. 62/360,171, filed on Jul. 8, 2016, provisional application No. 62/357,770, filed on Jul. 1, 2016, provisional application No. 62/353,755, filed on Jun. 23, 2016, provisional application No. 62/345,634, filed on Jun. 3, 2016, provisional application No. 62/345,624, filed on Jun. 3, 2016, provisional application No. 62/339,463, filed on May 20, 2016, provisional application No. 62/306,360, filed on Mar. 10, 2016.

(51) Int. Cl.
*H04L 12/28* (2006.01)
*H04W 28/02* (2009.01)
*H04W 84/04* (2009.01)

(56) References Cited

U.S. PATENT DOCUMENTS

| | | | |
|---|---|---|---|
| 10,764,114 | B2 | 9/2020 | Chapman et al. |
| 10,798,603 | B2 | 10/2020 | Chapman et al. |
| 11,252,742 | B2* | 2/2022 | Andreoli-Fang .......... H04W 28/0278 |
| 2003/0031161 | A1 | 2/2003 | Froehlich et al. |
| 2003/0128672 | A1 | 7/2003 | Komandur et al. |
| 2003/0206524 | A1 | 11/2003 | Mohanty et al. |
| 2006/0234716 | A1 | 10/2006 | Vesterinen et al. |
| 2007/0047553 | A1 | 3/2007 | Matusz et al. |
| 2008/0056151 | A1 | 3/2008 | Gazier et al. |
| 2010/0037112 | A1 | 2/2010 | Graumann |
| 2010/0202391 | A1 | 8/2010 | Palanki et al. |
| 2012/0093070 | A1 | 4/2012 | Huang et al. |
| 2012/0287784 | A1 | 11/2012 | Shatzkamer et al. |
| 2013/0114960 | A1 | 5/2013 | Goikhman |
| 2014/0050095 | A1 | 2/2014 | Szilagyi et al. |
| 2014/0126399 | A1 | 5/2014 | Damnjanovic et al. |
| 2014/0254697 | A1 | 9/2014 | Zhang et al. |
| 2014/0307627 | A1 | 10/2014 | Shatzkamer et al. |
| 2015/0229970 | A1 | 8/2015 | Ma et al. |
| 2015/0289266 | A1 | 10/2015 | Hsu et al. |
| 2017/0265216 | A1 | 9/2017 | Andreoli-Fang et al. |

OTHER PUBLICATIONS

Gable Television Laboratories, "Data-Over-Cable Service Interface Specifications, DOCSIS® 3.1, MAC and Upper Layer Protocols Interface Specification," Jan. 2017. (835 pgs.).

Chapman, John T. et al., "Full Duplex DOCSIS," Proceedings of the INTX/NCTA Technical Forum, May 2016 (29 pgs.).
Chapman, John T. et al., "Impact of CCAP to CM Distance in a Remote PHY Architecture," Proceedings of the INTX/NCTA Technical Forum, Apr. 2015 (52 pgs.).
Backhaul Technologies for Small Cells: Use Cases, Requirements and Solutions, The Small Cell Forum, www.scf.io/doc/100; Feb. 14, 2013 (78 pgs.).
"Coordinated multi-point operation for LTE physical layer aspects," 3GPP TR 36.819 v11.1.0,Sep. 2013 (69 pgs.).
"Coordinated multi-point operation for LTE with non-ideal backhaul," 3GPP TR 36.874 v12.0.0, Dec. 2013 (44 pgs.).
NGMN Alliance, "5G White Paper," Next Generation Mobile Networks (NGMN) Consortium, Feb. 2015 (125 pgs.).
FCC Office of Engineering and Technology and Consumer and Governmental Affairs Bureau, "Measuring Broadband America Fixed Broadband Report, A Reporton Consumer Fixed Broadband Performance in the U.S." 2014, , 2014 (68 pgs.).
"Perspectives on Vertical Industries and Implications for 5G," Next Generation Mobile Networks (NGMN) Consortium, Sep. 2016 (41 pgs.).
"Study on latency reduction techniques for LTE," 3GPP TR 36.881 v14.0.0, Jun. 2016 (99 pgs.).
G. White, "Active Queue Management (AQM) Based on Proportional Integral Controller Enhanced (PIE) for Data-Over-Cable Service Interface Specifications (DOCSIS) Cable Modems"; https://tools.ietf.org/html/irc8034; retrieved Oct. 3, 2018 (18 pgs.).
"White Paper of Next Generation Fronthaul Interface," China Mobile Research Institute, et al., Oct. 2015 https://docplayer.net/46899964-White-paper-of-next-generation-fronthaul-interface.html ;retrieved Oct. 3, 2018 (27 pgs.).
"5G; Study on New Radio Access Technology" (3GPP TR 38.9125 Version 14.1.0 Release 14), ETSI Oct. 2017 (78 pgs.).
"FAPI and nFAPI Specifications,Document 082.09.05"; The Small Cell Forum Release 9.0, May 2017 (335 pgs.).
Chapman, John T et al., Mobile Backhaul over DOCSIS, 2017 Fall Technical Forum, SCTE-ISBE and NCTA (32 pgs.).
Jennifer Andreoli-Fang, John T. Chapman, "Real-Time Experimentation with Mobile-Aware Scheduling for Low Latency Backhaul," unpublished IEEE Infocom, Apr. 2018 (9 pgs.).
Partial International Search dated Sep. 3, 2018, issued in PCT/US2018/033286 (16 pgs.).
Takashi Isobe et al: "RADIC-TCP: High-speed protocol applied for virtual private WAN" Telecommunications (ICT), 2011 18th International Conference on, IEEE, May 8, 2011 (May 8, 2011), pp. 505-510, XP031997052, DOI: 10 1109/CTS.2011.5898978 ISBN: 978-1-4577-0025-5 p. 506, right-hand column (6 pgs.).
International Search Report and Written Opinion dated Nov. 7, 2018, issued in PCT/US2018/033286 (21 pgs.).
International Search Report and Written Opinion dated May 21, 2019, issued in PCT/US2019/020814 (19 pgs.).
Alasti et al., Quality of Service in WiMAX and LTE Networks, May 2010, IEEE Communications Magazine, Topics in Wireless Communictions (2010) (8 pgs.).
Office Action issued in European Patent Office Application 18730571.9-1205, dated Mar. 30, 221 (4 pgs).

* cited by examiner

TECHNIQUES FOR WIRELESS ACCESS AND WIRELINE NETWORK INTEGRATION

CLAIM OF PRIORITY APPLICATIONS

This application is a continuation of U.S. application Ser. No. 16/871,087, filed May 11, 2020 and issued as U.S. Pat. No. 11,252,742 on May 11, 2020, which is a continuation of U.S. application Ser. No. 15/456,115, filed Mar. 10, 2017 and issued as U.S. Pat. No. 10,652,917 on May 11, 2020, which claimed the benefit of priority under 35 U.S.C. § 119(e) to U.S. Provisional Application Ser. No. 62/306,360, entitled "END-TO-END QOE SUPPORTED WIRELESS-WIRELINE INTEGRATION," filed Mar. 10, 2016; U.S. Provisional Application Ser. No. 62/339,463, entitled "LATENCY REDUCTION FOR LTE SMALL CELLS WITH FIXED BACKHAUL," filed May 20, 2016; U.S. Provisional Application Ser. No. 62/345,624, entitled "NETWORK CONTROLLED DYNAMIC SMALL CELL MANAGEMENT," filed Jun. 3, 2016; U.S. Provisional Application Ser. No. 62/345,634 entitled "EXPEDITED SESSION SETUP," filed Jun. 3, 2016; U.S. Provisional Application Ser. No. 62/353,755 entitled "LATENCY REDUCTION FOR VIRTUALIZED LTE SMALL CELLS WITH FIXED BACKHAUL," filed Jun. 23, 2016; U.S. Provisional Application Ser. No. 62/357,770 entitled "WIRELESS ACCESS AND WIRELINE NETWORK INTEGRATION," filed Jul. 1, 2016; U.S. Provisional Application Ser. No. 62/360,171 entitled "TECHNIQUES FOR BACKHAULING AN LTE SMALL CELL OVER A DOCSIS NETWORK," filed Jul. 8, 2016; U.S. Provisional Application Ser. No. 62/362,033 entitled "PIPELINING HARQ RETRANSMISSIONS FOR SMALL CELL BACKHAUL," filed Jul. 13, 2016; U.S. Provisional Application Ser. No. 62/405,683 entitled "CMTS GRANT MATH FOR LATENCY REDUCTION FOR VIRTUALIZED LTE SMALL CELLS WITH FIXED BACKHAUL," filed Oct. 7, 2016; U.S. Provisional Application Ser. No. 62/405,686 entitled "HARQ RETRANSMISSION PIPELINING FOR TRADITIONAL ENB AND VIRTUALIZED SMALL CELL WITH FIXED BACKHAUL," filed Oct. 7, 2016; and U.S. Provisional Application Ser. No. 62/443,105 entitled "PACKET SEGMENTATION IN STANDALONE SMALL CELL," filed Jan. 6, 2017. The disclosure of the prior applications are considered part of (and are incorporated by reference in) the disclosure of this application.

TECHNICAL FIELD

This disclosure relates in general to the field of communications and, more particularly, techniques for integration of wireless access and wireline networks.

BACKGROUND

Today's communication systems may include separate wireless and wireline portions, each of which may be owned and controlled by different operators. Even though some cable operators, also known as Multiple System Operators ("MSOs") use Data Over Cable Service Interface Specification ("DOCSIS") networks for backhauling Internet traffic, separate networks, such as mobile core, DOCSIS, and radio, have limited to no visibility into parts of the other network types. Typically, each network type, such as DOCSIS and LTE, have separate traffic scheduling algorithms. As a result, currently when these types of networks are networks are combined, the resulting architecture may be inefficient and may result in longer latency.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One embodiment is a method and includes receiving at a termination element of a first network a bandwidth report ("BWR"), in which the BWR includes information regarding a data transmission opportunity over a second network for at least one endpoint data; scheduling a first network transmission opportunity for the at least one endpoint data using information derived from the received BWR; and receiving from a first network forwarding device the at least one endpoint data in accordance with the scheduled first network transmission opportunity.

Example Embodiments

With regard to wireless network deployments, many network operators, are entering the mobile space using, for example, a Mobile Virtual Network Operator ("MVNO"), or Mobile Other Licensed Operator ("MOLO"), model as an initial step. Network operators include but are not limited to Multiple-System Operators ("MSOs"), Telecommunications Companies ("telcos"), satellite operators (including high speed satellite broadband services), fiber operators, and UAV internet providers. An MVNO is a wireless communications services provider that does not own all or a portion of the wireless network infrastructure over which the operator provides services to its customers. An MVNO may enter into a business arrangement with a Mobile Network Operator ("MNO") to obtain bulk access to network services at wholesale rates and then sets retail prices independently. An MVNO may use its own customer service, billing, marketing, and sales personnel or could use the services of a Mobile Virtual Network Enabler ("MVNE"). With the existing Hybrid Fiber Coaxial ("HFC") infrastructure, network operators, such as MSOs, are in a position to readily deploy mobile small cells, as well as backhaul/fronthaul/midhaul (hereinafter collectively referred to as "haul" or "hauling") their own network traffic. MSOs can leverage small cells to achieve better MVNO economics. Furthermore, network operators utilizing an MVNO/MONO model are positioned to backhaul MNO network traffic between small cell/remote radio head connected wireless devices supported by an MNO and the MNO's mobile core.

Figure 1A:
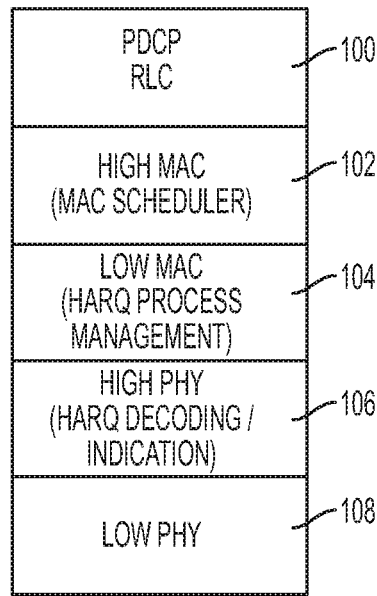
FIG. 1A is a simplified block diagram illustrating LTE functional radio protocol stack in accordance with embodiments described herein.

As used herein, the term "small cell" refers to a range of low-powered radio access nodes, including microcells, picocells, and femtocells, that operate in both licensed and unlicensed spectrum with a smaller range than that of a "macrocell." It will be recognized that, while techniques disclosed herein are primarily described with reference to small cells, the techniques may be broadly applicable to other types and sizes of radios, including, for example, macrocells, microcells, picocells, and femtocells. Additionally, in accordance with features of embodiments described herein, a small cell may be implemented as a standalone small cell, or simply a small cell ("SC") or eNodeB ("eNB"), in which its functionality is contained within a single component, or it may be implemented as a split small cell in which its functionality is split into separate components including a central small cell ("cSC") and a remote small cell ("rSC"). FIG. 1A is a simplified block diagram illustrating LTE functional radio protocol stack in accordance with embodiments described herein. As shown in FIG. 1A, LTE functionality includes a Packet Data Convergence Protocol ("PDCP")/Radio Link Control ("RLC") layer 100, a high Medium Access Control ("MAC") layer 102, which includes MAC scheduling functionality, a low MAC layer 104, which includes HARQ process management functionality, a high physical ("PHY") layer 106, which includes HARQ decoding and indication functionality, and a low PHY layer 108. It will be noted that the functional split in a split SC may occur between any of the functional layers illustrated in FIG. 1A, with certain of the functions (e.g., PDCP/RLC and high and low MAC) residing in the cSC and the remaining functions (e.g., high and low PHY) residing in the rSC.

Figure 1B:
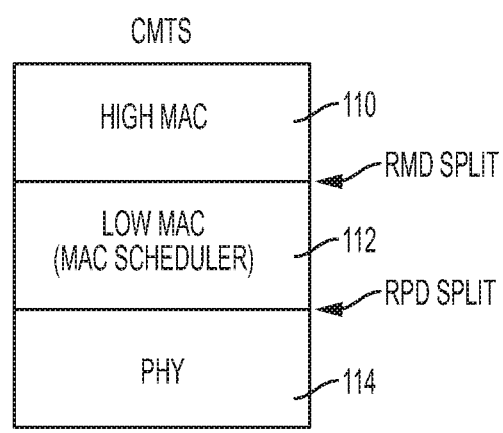
FIG. 1B is a simplified block diagram illustrating CMTS functional decomposition in accordance with embodiments described herein.

FIG. 1B is a simplified block diagram illustrating CMTS functional decomposition in accordance with embodiments described herein. As shown in FIG. 1B, CMTS functionality includes a high MAC layer 110, a low MAC layer 112, which includes MAC scheduling functionality, and a PHY layer 114. As also shown in FIG. 1B, a remote MAC/PHY device ("RMD") split is defined as a split between the high MAC layer 110 and the low MAC layer 112 and a remote PHY device ("RPD") split is defined as a split between the low MAC layer 112 and the PHY layer 114.

It is recognized that small cell technology will pay a significant role in future 5G networks. Some 5G applications (e.g., mission critical MTC, VR, tactile Internet) require 1-10 ms end-to-end deterministic latency. This includes time allocated for device processing, air interface round trip time ("RTT"), and network processing. The backhaul latency must also fit within this end-to-end latency budget. 3GPP "New Radio" focuses on a new air interface design to achieve the latency budget; however, today's backhaul incurs latency an order of magnitude more. Networks with lower backhaul latency will be able to provide superior 5G experience and serve niche 5G applications. Other applications include Wi-Fi, 3G, 4G, LTE, etc.

Cable networks are well suited to provide backhaul for small cell and other types of networks, including, for example, fiber networks, other optical networks, and satellite networks. Cable networks and the wireless access portions are currently independent links; there exists no joint optimization to maximize efficiencies on the wired or wireless links. While it will be understood that embodiments described herein may be applied to a number of fronthaul and backhaul networks, for sake of clarity and improve understanding the remainder of this disclosure will be directed to cable networks, MSO, and DOCSIS and backhaul applications. This is not meant to be limiting in anyway.

There are several issues to be considered in integrating mobile access and cable networks. One is latency reduction. In particular, reducing access latency improves TCP performance and wireless user quality of experience ("QoE"), driving a competitive 3G, 4G, and 5G backhaul solution. Additionally, integration may provide optimal resource coordination, as the coordinator of the integrated network has a global view of available resources on its served network. Moreover, coordinated scheduling and QoS between networks facilitates optimization of spectrum use, network capacity, average and peak throughput, and coverage area, to name a few. Integration may also provide consistency across deployments, as implementing resource management on an integrated network could produce consistent behavior across deployed networks (stickiness to integrated network rather than end-device vendor). With regard to cost savings, resource management allows for effective use of wireless resources, supporting more users without requiring large amounts of unlicensed spectrum. Finally, an integrated system would enable implementation of advanced network techniques.

In accordance with features of embodiments described herein, techniques for integrating mobile access and wireline (particularly cable) networks provide a number of solutions to above-noted concerns, including latency reduction per burst, latency reduction per flow, bearer or packet traffic level steering utilizing available wireless technologies, virtualizing of certain functionalities of the small cells, as well as numerous others to be described in detail herein below. In particular, with regard to latency reduction, embodiments described herein enable coordination of request-grant loops for wireless and wireline links. With regard traffic steering, embodiments described herein enable a small cell to steer or split a bearer between wireless radios to improve resource utilization, enable steering to occur between small cells for a UE within overlapping coverage areas, and may be implemented at a Modem Termination System ("MTS"), which includes termination systems such as (but not limited to) CMTSs, Optical Network Terminals ("ONTs"), Optical Line Terminals ("OLTs"), Network Termination Units ("NTUs"), and Satellite Termination Units ("STUs"). In cable or DOCSIS examples and embodiments "CMTS" is used, although it will be understood that in any embodiment, the CMTS may be replaced by a network specific termination device or MTS.

Certain embodiments discussed herein include techniques to minimize latency inherent in communications systems and are described using backhauling LTE data over a DOCSIS access network as an example. In certain embodiments, the techniques involve defining an Application Programming Interface ("API") between an LTE upstream ("US") scheduler and a DOCSIS US scheduler that enables the scheduling operations to be pipelined. In operation, a DSC network element, which may include an SC (standalone or split), a cable modem ("CM"), and/or an optional network interface device ("NID"), may both issue bandwidth grants to a UE and provide the grant information to the DOCSIS system. The DOCSIS scheduler uses the grant information to line up "just-in-time" grants on the DOCSIS system.

In accordance with features of embodiments described herein, each DSC may aggregate multiple unlicensed radio bearers it serves into a single DOCSIS service flow. Each licensed radio bearer is mapped into a separate SF with QoS guarantee. Advantages of DSC include latency reduction, spectral efficiency, and cost savings. With regard to latency reduction, using a centralized CMTS scheduler, one scheduling process can be performed across the network served by the CMTS. Centralized CMTS scheduling reduces bearer modification latency across the network served by the CMTS and centralized scheduling across licensed and unlicensed band reduces traffic latency. With regard to spectral efficiency, CMTS has a global view of spectral resources at its served network. Scheduling is performed by the CMTS to optimize licensed and unlicensed spectrum, as well as coverage area. With regard to cost savings, the eNB (or small cell) is simplified, exploiting the eNB resource efficiently, the MAC can be virtualized when coupled with a remote PHY ("SDR" or "RPD"), and wireless component vendors can be mixed and matched because control is performed at the CMTS.

In a more traditional backhaul architecture, small cells are expected to be deployed within or outside of a macro cell coverage area for boosting capacity, enhancing coverage, etc. Traditionally, backhaul is enabled via a mobile operator's fiber infrastructure. There are two major issues with extending this traditional backhaul architecture for small cells. First, costs can become high when fiber is needed to be run for each small cell. The traditional peer-to-peer architecture between the mobile core and each macro cell works well for the traditional sparse macro cell deployment model. Second, there is lack of support for the X2 interface. The lack of low latency logical links between small cells results in inefficient and non-optimal network transport. In contrast, in accordance with features of embodiments described herein, DOCSIS 3.1 CMTS is deployed to support a limited number of commercial grade, integrated DOSIS small cells. Existing HFC infrastructure is reused; accordingly, there is no new cost associated with running new fiber to small cell sites. Additionally, depending on the peering point for LTE traffic, local breakout for traffic that does not need to traverse back to the mobile core can be supported by the CMTS. The CMTS can implement an intelligent scheduler to dynamically load balance the small cells based on a variety of factors.

Figure 2A:
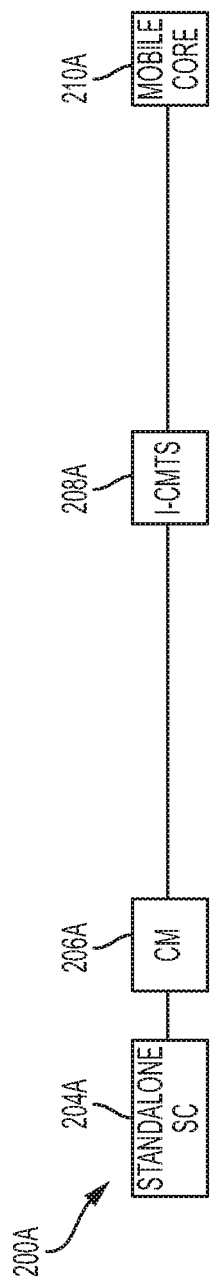
FIGS. 2A-2C are simplified block diagrams illustrating various arrangements of a DOCSIS small cell ("DSC") system including a standalone small cell and a split Cable Modem Termination System ("CMTS") for connecting user equipment ("UE") to a mobile core in accordance with embodiments described herein.

FIG. 2A illustrates a simplified block diagram of one embodiment of a DSC system communications environment 200A in which a DOCSIS network is used to provide a backhaul for an LTE eNB. The communications environment 200A supports connection of at least one user equipment device ("UE") (not shown), via a radio frequency ("RF") interface to a standalone SC 204A. As used herein, UE can be associated with clients, customers, or end users wishing to initiate a communication in a communication system via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within a communication system. UE may also be inclusive of a suitable interface to the human user, such as a microphone, a display, or a keyboard or other terminal equipment. UE may also be any device that seeks to initiate a communication on behalf of another entity or element, such as a program, a database, or any other component, device, element, or object capable of initiating an exchange within a communication system. Data, as used herein in this document, refers to any type of numeric, voice, video, media, or script data, or any type of source or object code, or any other suitable information in any appropriate format that may be communicated from one point to another. On power up, UE can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

Referring again to FIG. 2A, the SC 204A is connected to a cable modem ("CM") 206A (also sometimes called just "modem" herein). The CM 206A may be connected to one or multiple SC 204A. The CM 206A is connected to a cable modem termination system ("CMTS") 208A via hybrid fiber coax ("HFC"), for example. In the embodiment illustrated in FIG. 2A, the CMTS 208A is implemented as an integrated CMTS ("I-CMTS"). The CMTS 208A connects the SC 204A/CM 206A to a wireless core, which in the illustrated embodiment comprises a mobile core 210A, which may be implemented as an LTE packet core. It will be recognized that wireless core may also comprise a WiFi core, a 5G core, or any other wireless network core. It will be understood that CM 206A may be collocated with SC 204A or may be located separate and independent from the SC. Additionally, a collocated combination of the SC 204A/CM 206A may be referred to herein as a DSC network element.

Figure 2B:
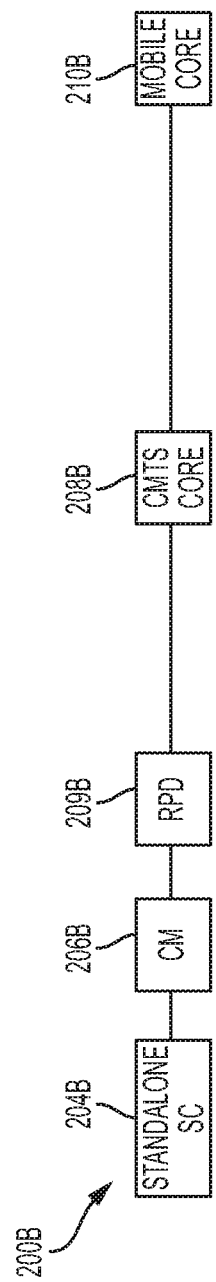

FIG. 2B illustrates a simplified block diagram of another embodiment of a DSC system communications environment 200B in which a DOCSIS network is used to provide a backhaul for an LTE eNB. Similar to the communications environment 200A, the communications environment 200B supports connection of at least one UE via an RF interface to a standalone SC 204B. One or multiple SC 204B is connected to a CM 206B. In the embodiment shown in FIG. 2B, CMTS functionality is split between a CMTS core 208B and an RPD 209B. The RPD 209B/CMTS core 208B connects the SC 204B/CM 206B to a mobile core 210B, which may be implemented as an LTE packet core. It will be understood that CM 206B may be collocated with SC 204B or may be located separate and independent from the SC. Additionally, a collocated combination of the SC 204B/CM 206B may be referred to herein as a DSC network element.

Figure 2C:

FIG. 2C illustrates a simplified block diagram of yet another embodiment of a DSC system communications environment 200C in which a DOCSIS network is used to provide a backhaul for an LTE eNB. Similar to the communications environment 200A, the communications environment 200C supports connection of at least one UE via an RF interface to a standalone SC 204C. One or multiple SC 204C is connected to a CM 206C. In the embodiment shown in FIG. 2C, CMTS functionality is split between a remote MAC/PHY 207C and a router 209C. The remote MAC/PHY 207C/router 209C connects the SC 204C/CM 206C to a mobile core 210C, which may be implemented as an LTE packet core. It will be understood that CM 206C may be collocated with SC 204C or may be located separate and independent from the SC. Additionally, a collocated combination of the SC 204C/CM 206C may be referred to herein as a DSC network element.

Figure 2D:
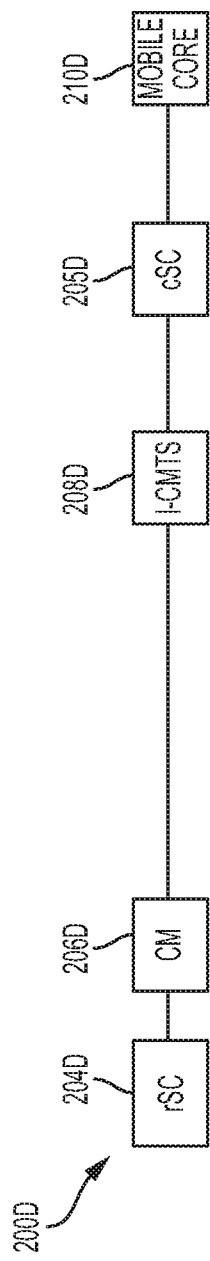
FIGS. 2D-2F are simplified block diagrams illustrating various arrangements of a DSC system including a split small cell and a split CMTS for connecting UE to a mobile core in accordance with embodiments described herein.

FIG. 2D illustrates a simplified block diagram of one embodiment of a DSC system communications environment 200D in which a DOCSIS network is used to provide a backhaul for an LTE eNB. The communications environment 200D supports connection of at least one UE via an RF interface to an rSC 204D portion of a split SC, which also includes a cSC portion 205D. One or more rSC 204D is connected to a CM 206D (also sometimes called just "modem" herein). The CM 206D is connected to a cable modem termination system ("CMTS") 208D via hybrid fiber coax ("HFC"), for example. In the embodiment illustrated in FIG. 2D, the CMTS 208D is implemented as an I-CMTS. The CMTS 208D/cSC 205D connects the rSC 204D/CM 206D to a mobile core 210D, which may be implemented as an LTE packet core. It will be understood that CM 206D may be collocated with rSC 204D or may be located separate and independent from the rSC. Additionally, a collocated combination of the rSC 204D/CM 206D may be referred to herein as a DSC network element. In certain embodiments, I-CMTS, cSC, and/or mobile core may also be collocated.

Figure 2E:
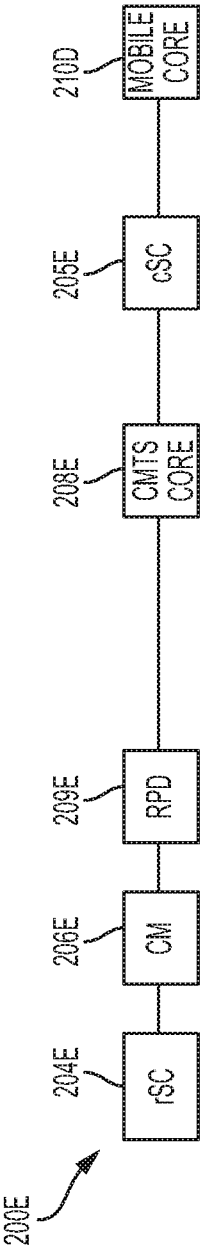

FIG. 2E illustrates a simplified block diagram of another embodiment of a DSC system communications environment 200E in which a DOCSIS network is used to provide a backhaul for an LTE eNB. Similar to the communications environment 200A, the communications environment 200E supports connection of at least one UE via an RF interface to an rSC 204E portion of a split SC, which also includes a cSC portion 205E. One or more rSC 204E is connected to a CM 206E. In the embodiment shown in FIG. 2E, CMTS functionality is split between a CMTS core 208E and an RPD 209E. The RPD 209E/CMTS core 208E/cSC 205E connects the rSC 204E/CM 206E to a mobile core 210E, which may be implemented as an LTE packet core. It will be understood that CM 206E may be collocated with rSC 204E or may be disposed in a location separate and independent from the rSC. Additionally, a collocated combination of the rSC 204E/CM 206E may be referred to herein as a DSC network element.

Figure 2F:
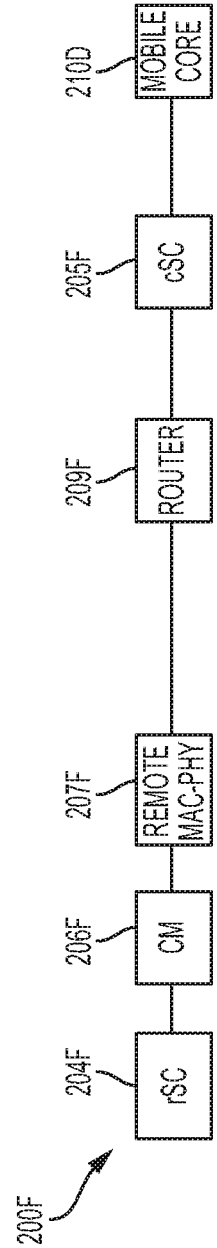

FIG. 2F illustrates a simplified block diagram of yet another embodiment of a DSC system communications environment 200F in which a DOCSIS network is used to provide a backhaul for an LTE eNB. Similar to the communications environment 200A, the communications environment 200F supports connection of at least one UE via an RF interface to an rSC 204F portion of a split SC, which also includes a cSC portion 205F. One or more rSC 204F is connected to a CM 206F. In the embodiment shown in FIG. 2F, CMTS functionality is split between a remote MAC/PHY 207F and a router 209F. The remote MAC/PHY 207F/router 209F/cSC 205F connects the rSC 204F/CM 206C to a mobile core 210F, which may be implemented as an LTE packet core. It will be understood that CM 206F may be collocated with rSC 204F or may be disposed in a location separate and independent from the rSC. Additionally, a collocated combination of the rSC 204F/CM 206F may be referred to herein as a DSC network element.

It will be noted that FIGS. 2A-2C illustrate embodiments comprising a standalone SC, while FIG. 2D-2F illustrate embodiments comprising a split SC. It will be recognized that techniques described herein are equally applicable to any of the embodiments shown in FIGS. 2A-2F. It will be further recognized that the embodiments illustrated in FIGS. 2A-2F are provided for purposes of example only and are not meant to be an exhaustive list of embodiments in which the techniques described herein may be advantageously implemented. Moreover, although not illustrated in FIGS. 2A-2F, a network interface device ("NID") may optionally be provided between the SC/rSC and CM for purposes to be described in greater detail hereinbelow.

Figure 3:
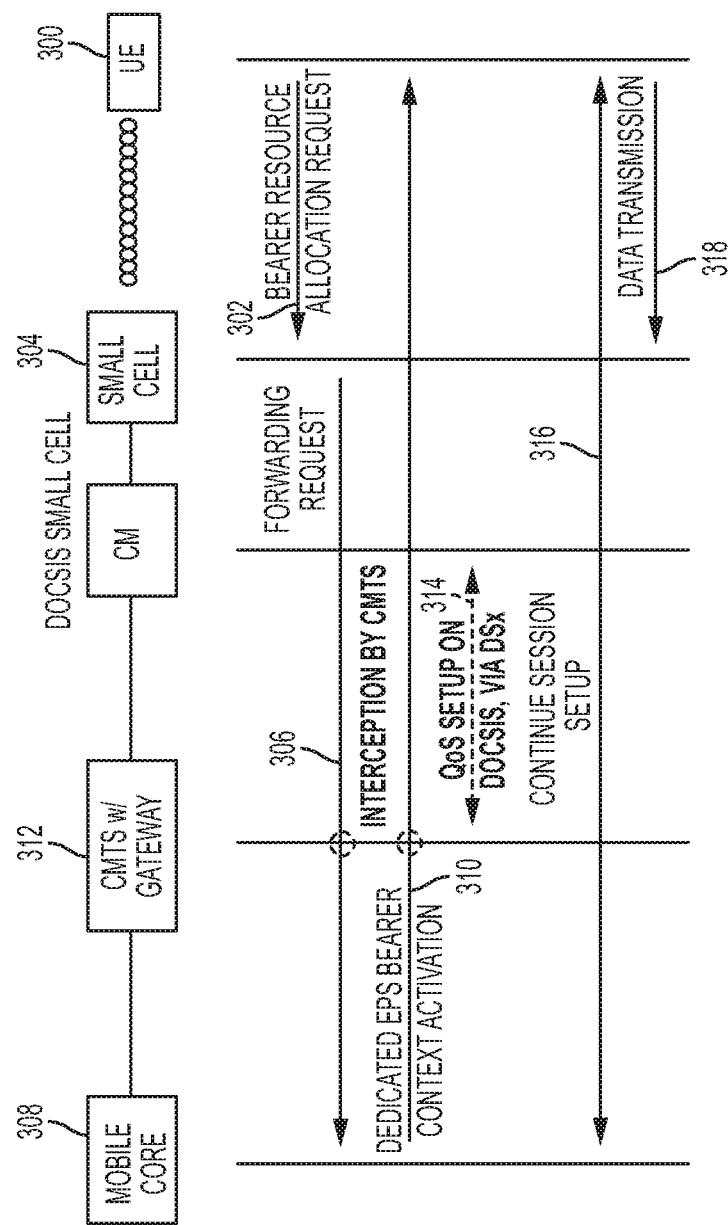
FIG. 3 is a simplified block diagram illustrating a technique for Quality of Service ("QoS") matching and expedited session setup in accordance with embodiments described herein.

FIG. 3 is a simplified block diagram illustrating a technique for Quality of Service ("QoS") matching and expedited session setup in accordance with embodiments described herein. In general, when a UE or a mobile core wants to establish a communication session with the other, the UE, small cell and LTE packet core exchange data sessions establishment control signaling that includes QoS parameters. Currently, there is no QoS setup on the DOCSIS link. Embodiments herein enable setting up a session with matching QoS on DOCSIS, as well as doing so in an expedited fashion. Referring now to FIG. 3, which illustrates a UE-initiated session setup scenario, when a UE 300 launches an application, it requests initiation of a new LTE session (Data Radio Bearer ("DRB")) and QoS reconfiguration by sending a bearer resource allocation request 302 to an eNB/SC 304. The eNB 304 forwards a corresponding request 306 to a mobile core node 308, which responds by sending a dedicated EPS bearer context activation 310. In accordance with features of embodiments described herein, a CMTS with gateway node 312 intercepts the request 306 and/or response 310 and configures a new DOCSIS service flow or reconfigures an existing DOCSIS service flow to match the QoS parameters of the new LTE session, critical for real-time communication (RTC) applications, as represented in FIG. 3 by a double-ended arrow 314. At the same time, LTE session setup continues until completion (316), at which point UE 300 may begin transmitting data (318).

The CMTS performs intercept, service flow (re-)configuration during LTE session setup, substantially in parallel with LTE session setup, resulting in reduced session setup latency. In a particular embodiment, the CMTS "snoops" the LTE session setup and performs its own corresponding session setup, thereby enabling a DOCSIS session setup. In certain embodiments, a common policy service would setup corresponding sessions on both the mobile and DOCSIS networks. The CMTS will also snoop session keep-alives and the session tear-down as well. The CMTS will also need to know what the service profile will be. This could be a default profile in the CMTS for all LTE connections, or it could be based upon snooping specific LTE parameters that relate to SLA parameters like CIR and max bandwidth. After intercepting the LTE session setup messages, CMTS obtains a list of Tunnel Endpoint IDs (TEIDs) and the corresponding QoS Class Identifier (QCI), as well as the UE IP address. This allows the CMTS to classify LTE bearer packets onto the correct DOCSIS sessions without having to unwrap the GPRS Tunneling Protocol (GTP) tunnels. Depending on the forwarding model, the CMTS may need to keep track of the VLAN ID associated with LTE control plane traffic.

Figure 4:
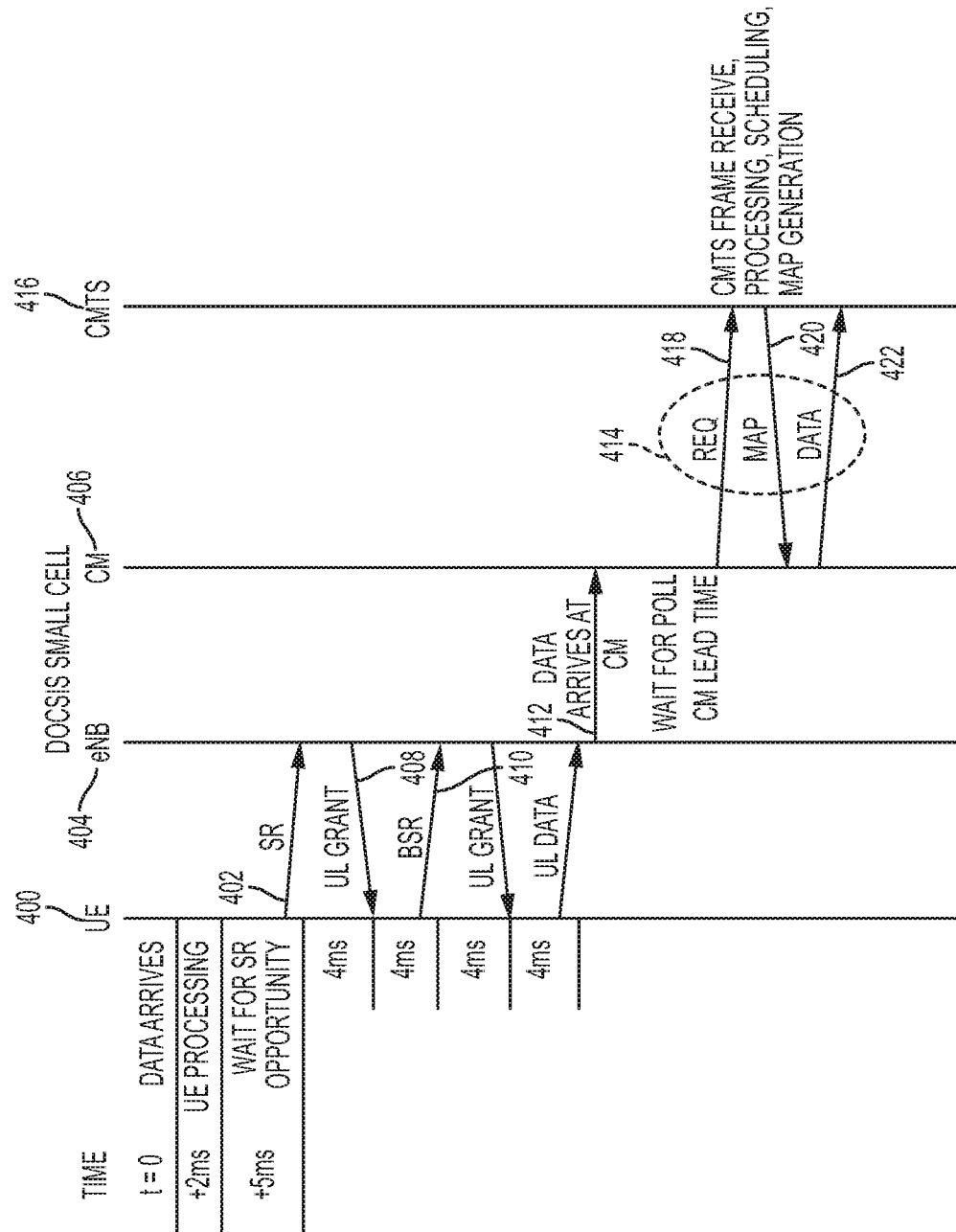
FIG. 4 illustrates a signaling diagram illustrating LTE and DOCSIS request-grant processes in a DSC system having a standalone SC in accordance with embodiments described herein.

Techniques for reducing latency will now be discussed in greater detail. In accordance with features of embodiments described herein, an LTE scheduler is provided in a SC (or eNB) for granting access to an LTE network. Referring to FIG. 4, in a system comprising a standalone SC (or eNB), when UL data is available for transmission and no grants have been allocated to a UE 400, the UE sends a scheduling request ("SR") 402 to an LTE scheduler at an eNB 404 connected to a CM 406. The eNB 404 typically needs approximately 4 ms of turnaround time to decode the SR, and generate a scheduling grant ("UL grant") 408, which needs to arrive at the UE 400 approximately 4 ms prior to the granted time to allow for UE processing. Upon receipt of the UL grant, the UE 400 provides a buffer status report ("BSR") 410 of its logical channel groups ("LCG") to the eNB 404.

Two round trips may be needed before the first data arrives at the eNB 404/CM 406 (as indicated by an arrow 412), which in current arrangements, triggers initiation of a DOCSIS request-grant ("REQ-GNT") loop 414 between the CM 406 and a CMTS 416 requesting a DOCSIS scheduler residing in the CMTS to grant a data transmission opportunity. In particular, once data arrives at the CM 406, the CM will wait for a request transmission opportunity ("REQ," represented by an arrow 418), which typically takes 0 to 2 ms. If the request is not in contention with other CMs, the CMTS 416 will provide a grant ("MAP," represented by an arrow 420). The grant is typically 4 ms later, but can be longer. When the grant arrives, the CM 406 forwards the data (represented by an arrow 422) to the CMTS 416 at the grant time.

SR is a 1-bit indicator sent by the UE to request a grant of bandwidth for sending UL data. The SR alone is not sufficient for an eNB MAC scheduler to assign UL resources for data transfer; therefore, the eNB sends a grant of sufficient size to accommodate the BSR. BSR is a 4-byte MAC Control Element ("CE") that reports outstanding data for each of the UEs four logical channel groups ("LCGs"). The mapping of a radio bearer (logical channel) to an LCG is performed at radio bearer setup time by the eNB based on the corresponding QoS attributes of the radio bearers, such as QoS Class Identifier ("QCI"). For example, Radio Resource Control ("RRC") configuration and reconfiguration messages may always map to a fixed LCG such as LCG0. Each logical channel or multiple logical channels belong to an LCG can be mapped directly to a DOCSIS upstream ("US") service flow ("SF"). This mapping can be done by pushing policy into the CMTS from the DOCSIS policy engine, or the LTE policy engine, or a common policy system, or by the CMTS snooping the NAS (non-access stratum) signaling including the mobile session setup messages and mapping that to a DOCSIS service flow.

In accordance with features of embodiments described herein, instead of waiting for UE data to arrive at the CM before sending a transmission request to the CMTS/DOCSIS scheduler, the REQ-GNT processes on the LTE and cable systems may be pipelined to reduce latency.

Figure 5:
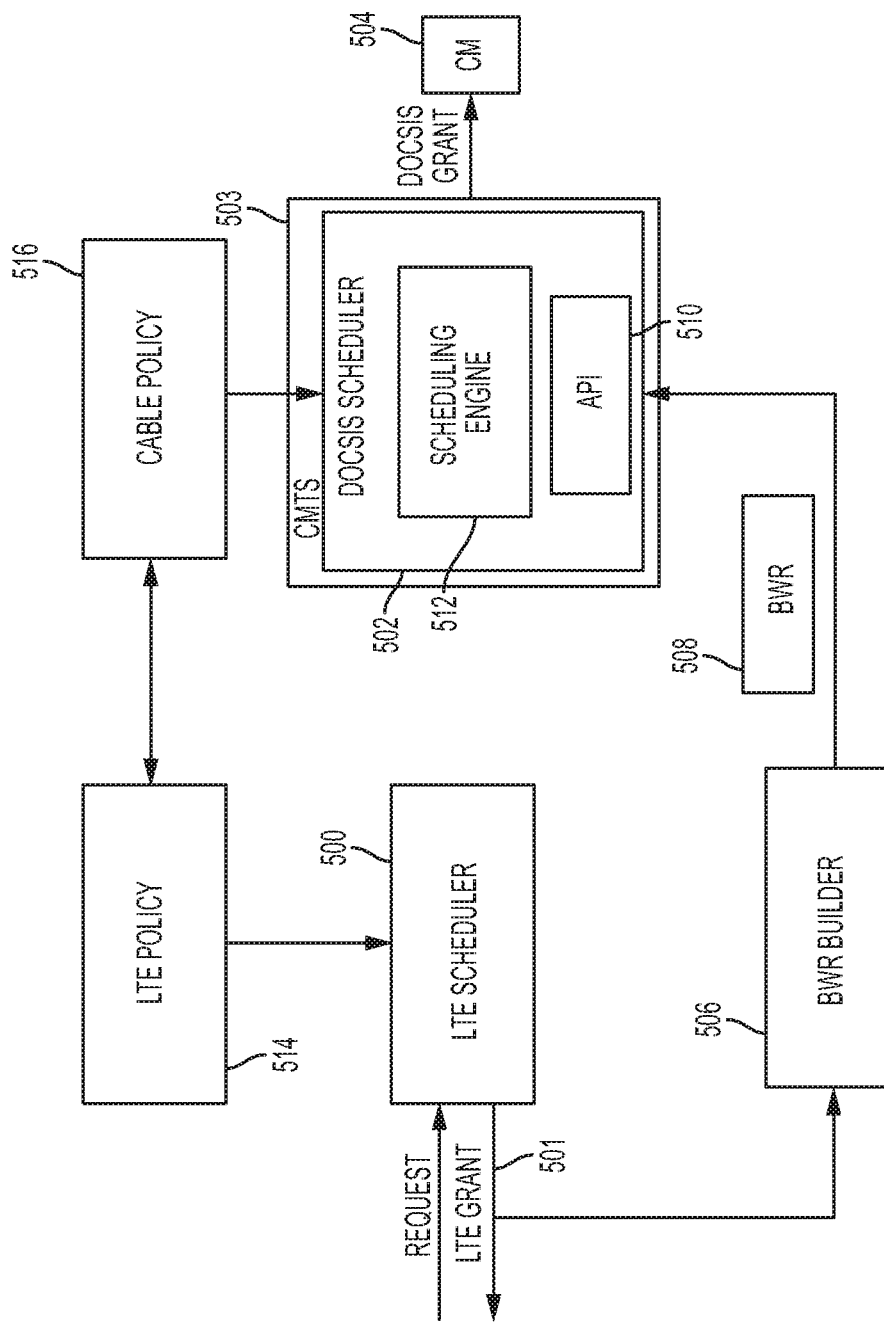
FIG. 5 is a simplified block diagram illustrating techniques for pipelining LTE and DOCSIS requests.

FIG. 5 is a simplified block diagram illustrating techniques for pipelining LTE and DOCSIS requests. In accordance with features of such embodiments described herein, when an LTE scheduler 500 deployed in a SC (or in a portion thereof, in the case of a split SC) issues a bandwidth grant to a UE, as represented by an arrow 501, the grant information may be sent to a DOCSIS scheduler 502 deployed in a CMTS 503 so that the CMTS can pre-generate DOSCIS grants to a CM 504 for transmitting UE data. This is a form of pipelining in which the first pipeline stage (i.e., the LTE scheduler 500) informs the next stage (i.e., the DOCSIS scheduler 502) of what is about to come. In an embodiment, the DOCSIS scheduler 502 executes once every 2 ms, such that half as frequently as LTE scheduler 500, the DOCSIS scheduler may aggregate LTE transactions from 2 LTE subframes (2 ms). To accommodate this, in one embodiment, a bandwidth report builder ("BWR builder") 506 intercepts the grant information sent by the LTE scheduler 500 and constructs a BWR 508, which is a special message describing the number of bytes to be transferred per QoS class (e.g., data, voice, signaling). Alternatively, the BWR 508 may correspond to a bulk grant that aggregates bytes expected in all QoS classes. In another embodiment, the BWR may include traffic profiles that are a result of HARQ retransmissions and/or packet delayed due to reassembly. A BWR indicates future bandwidth needed for the LTE system which is described with a forward-looking traffic profile. The forward-looking traffic profile may contain the quantity of bytes required at specific time interval, or policy information related to traffic flow, or trend or rate information.

To allow the CMTS 503 to pre-generate DOCSIS grant for the correct time for CM 504 to transmit LTE data, the BWR 508 includes the timing of the LTE grant, such as the LTE subframe number, or the IEEE 1588 timestamp. The CMTS 503 translates the LTE timing to DOCSIS timing.

This BWR 508 may be sent periodically (e.g., every 1 ms) to an API interface 510 of the DOCSIS scheduler 502 for use by a scheduling engine 512 in scheduling DOCSIS grants. The bandwidth report builder 506 may be collocated with LTE scheduler (e.g., in the eNB) 500 or may be deployed as an agent that that snoops the LTE signaling, which agent may be located in an NID or the CM, for example.

After the CM receives the BWR from the BWR builder, the CM needs to send it to the CMTS in an expedient manner, in order for the DOCSIS scheduler to pre-generate DOCSIS grants. To accommodate this, in one embodiment, the BWR is classified by the CM into and sent using a special DOCSIS service flow such as unsolicited grant service (UGS). In order to send BWR using UGS, the BWR needs to be a fixed length message, and the BWR builder sends the BWR in the same periodicity as the UGS grant interval. When servicing multiple UEs, the BWR aggregates all LTE grant info from the UEs into one BWR message and sends one BWR per period. In another embodiment, the BWR is classified into a real time polling service (RTPS). The CMTS polls the CM at regular interval, which allows the CM to forward BWR at pre-determined periodicity.

In certain embodiments, the BWR 508 is essentially an API into the DOCSIS scheduler 502. An LTE policy engine 514 and a DOCSIS policy engine 516 may be provided for specifying quality of service ("QoS") parameters, as well as the number of DOCSIS service flows to use, what type of scheduling to use, and other parameters during session setup.

In certain embodiments, policy may be used to determine how to map LTE transactions into DOCSIS transactions. For example, all of the LTE transactions set forth in the BWR (e.g., data, voice, signaling, high priority, low priority) could be mapped into a single DOCSIS service flow, in which case bandwidth allocation could be as simple as adding up the number of bytes, adding room for overhead, and sending a MAP. Alternatively, each request set forth in the BWR may be mapped to a different service flow and/or type of scheduling policy before a MAP is generated. The actual traffic profile is an allocation of the number of bytes to be transferred at a specific time, and is described in the MAP. Data and BWR may be aggregated to a single common service flow or mapped to separate service flows to preserve QoS at a queuing level.

As discussed above, it will be recognized by the skilled artisan after reading the present disclosure that other types of schedulers (e.g., Wi-Fi, PON) could be pipelined in the same manner using an appropriate interface between the schedulers for conveying scheduling information.

As indicated above, various challenges may be handled by the BWR. It will be noted that although there may be embodiments in which the BWR is either "stateful," in which case the BWR only lists new transactions that have not been previously reported (which will not include any retransmissions of transactions or partial transactions), it is beneficial for the BWR to be "stateless," in which case the BWR lists all currently outstanding transactions (whether or not previously reported), including any HARQ retransmissions. Additionally, the CMTS may be configured to access just the latest BWR, in which case a stateless BWR would be necessary to ensure that no transactions are lost. In embodiments in which the CMTS is configured to access all BWRs (which would presumably be maintained in a queue in this embodiment), the stateful type of BWR might facilitate processing.

Figure 6:
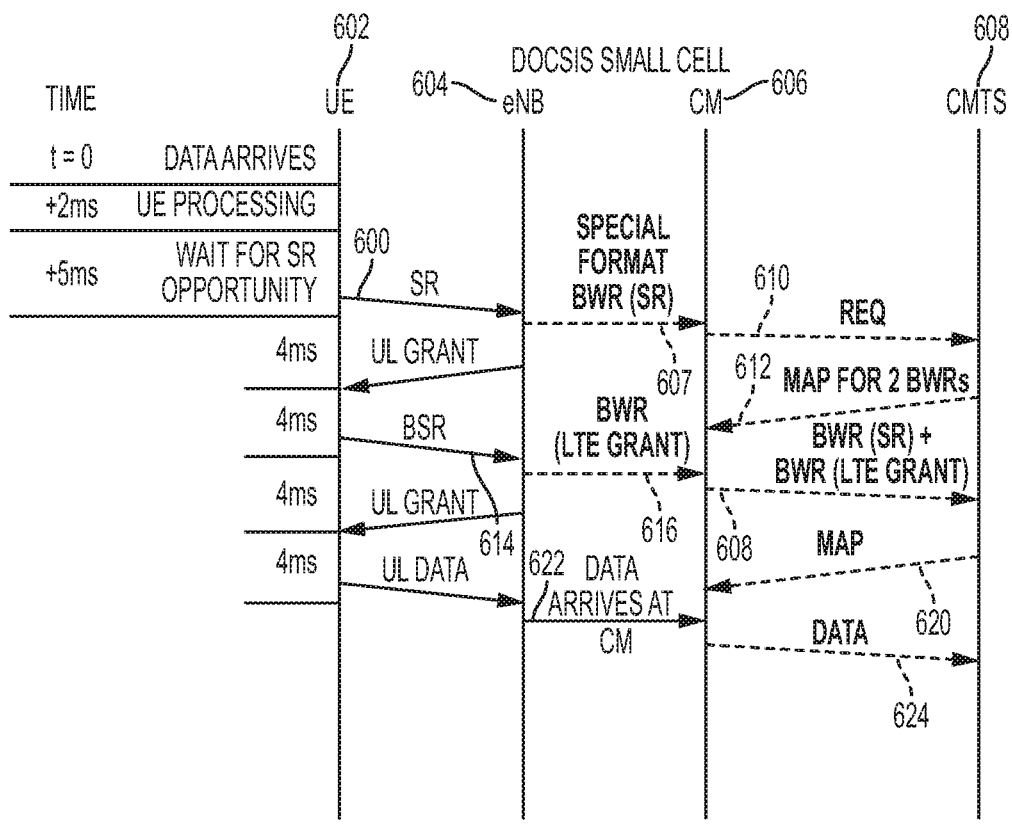
FIG. 6 is a signaling diagram illustrating techniques for pipelining LTE and DOCSIS requests with scheduling request ("SR") optimization in accordance with features of embodiments described herein comprising a standalone SC.

Referring now to FIG. 6, illustrated therein is a signaling diagram illustrating techniques for pipelining LTE and DOCSIS requests with SR optimization in accordance with features of embodiments described herein comprising a standalone SC (or eNB). As an optimization, an SR could be sent to a CM inside a version of the BWR message to get an early CMTS request going (as illustrated in FIG. 6). To avoid the CM having to interpret the SR, the eNB forms a specially formatted BWR ("BWR(SR)"), and the BWR(SR) is placed in the input port of the CM on the interface between the eNB and the CM. The BWR may include the LTE subframe number on which the SR was received so that the CMTS would know when to send a grant (MAP). In this manner, the CM does not have to interpret the SR.

As shown in FIG. 6, responsive to receipt of an SR 600 from a UE 602, an eNB 604 may indicate to a CM 606 that it is expecting UL data from the UE by forwarding the SR to the CM in the form of a specially formatted bandwidth report ("BWR") that includes the SR ("BWR(SR)"), as indicated by an arrow 607, which triggers the CM to initiate a REQ-GNT loop with a CMTS 608. In particular, the CM 606 sends a REQ message 610 to the CMTS 608. The DOCSIS scheduler of the CMTS 608 issues a grant large enough to send two BWRs, which is sent in a MAP grant 612. In the meantime, receipt of a BSR 614 from the UE 602 results in the creation at the eNB 604 of a BWR including LTE grant information ("BRW (LTE grant)"), which is forwarded to the CM 606 (arrow 616). The BWR (SR) and BWR (LTE grant) are forwarded to the CMTS 608, as indicated by an arrow 618, at the time indicated in the MAP grant 612. The DOCSIS scheduler at the CMTS 608 uses the information included in the BWR (LTE grant) message 618 to schedule a transmission time for the UE data and generates a MAP grant 620 indicative of the scheduled time to the CM 606 such that when data arrives at the CM 606, as indicated by an arrow 622, it may be forwarded to the CMTS 608 at the scheduled time, as represented by an arrow 624. It will be noted that, due to the pipelining enabled by the BWR, UE data may be sent to the CMTS 608 substantially more quickly than in the embodiment illustrated in FIG. 4.

Figure 7:
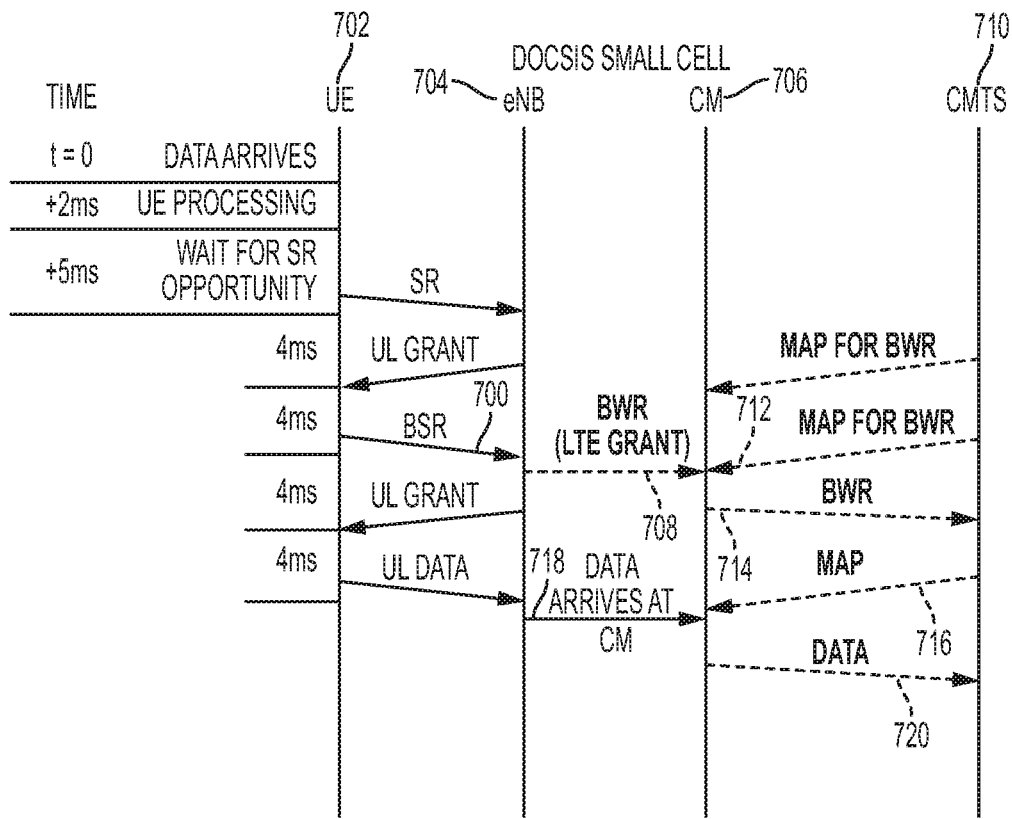
FIG. 7 is a signaling diagram illustrating techniques for pipelining LTE and DOCSIS requests in accordance with features of embodiments described herein comprising a standalone SC.

FIG. 7 is a signaling diagram illustrating techniques for pipelining LTE and DOCSIS requests without SR optimization in accordance with features of embodiments described herein comprising a standalone SC (or eNB). As shown in FIG. 7, receipt of a BSR 700 from a UE 702 results in creation at an eNB 704 of a BWR including LTE grant information ("BRW (LTE grant)"), which is forwarded to a CM 706, as indicated by an arrow 708. In the embodiment illustrated in FIG. 7, a CMTS 710 periodically polls the CM 706 by sending MAPs large enough to accommodate a BWR. At the next transmission opportunity granted to the CM 706 by a CMTS 710 (as indicated in a MAP for BWR 712), the BWR (LTE grant) is forwarded to the CMTS 710, as indicated by an arrow 714, at the time indicated in the MAP for BWR 712. The DOCSIS scheduler at the CMTS 710 uses the information included in the BWR (LTE grant) message 714 to schedule a transmission time for the UE data and generates a MAP grant 716 indicating the scheduled transmission time to the CM 706 such that when data arrives at the CM 706, as indicated by an arrow 718, it may be forwarded to the CMTS 710 at the scheduled time, as represented by an arrow 720. As with the embodiment illustrated in FIG. 7, using the pipelining enabled by the BWR, data may be sent to the CMTS significantly more quickly than in the embodiment illustrated in FIG. 4.

It will be recognized that, although only one eNB (eNB 704) is shown as being connected to the CM 706, scenarios exist in which the CM may support multiple eNBs. In such scenarios, the CM (or optional NID) will need to aggregate the BWRs from the multiple eNBs and send an aggregate BWR to the CMTS. The CMTS will schedule sufficient bandwidth for all of the LTE grants included in the aggregate BWR.

It will be noted that the BWR may carry a variety of information. At the very least, it carries the LTE grant to be scheduled in the future with the corresponding LTE subframe number(s). Other information that could be carried in the BWR includes the IEEE 1588 timestamp, or other timing information that the eNB uses to remain synchronized with the CMTS, the UE identifier, and the granted bytes for each of LCGs. Referring again to FIG. 7, in accordance with features of embodiments described herein, the eNB 704 includes the LTE grant in the BWR 708.

Additionally, the CMTS 710 relates an LTE grant time to a DOCSIS grant time by operating a protocol that translates the timestamp that eNB and CMTS use to remain time-aligned, such as IEEE 1588 timestamp, to DOCSIS minislot number.

Referring again to FIG. 7, the CM 706 must receive the BWR 708 and get it up to the CMTS 710 in an expedient manner. One option is to make the BWR a fixed length message so that the CMTS 710 could use the unsolicited grant service ("UGS"). To make this effective, the eNB 704 may need a max BWR packet sending rate that would equal the UGS grant interval. For example, the BWR could aggregate all of the information from all UEs into a single BWR and send one BWR for all UEs into one BWR message and send one BWR per LTE subframe.

As illustrated and described above, CMTS grant generation may proceed as follows. The BSR reports the buffer status of each LCG. The eNB forwards its scheduling grant ("LTE grant info") to the UE and to the CM (which forwards it to the CMTS) once the grant is determined by the LTE MAC scheduler. From this information, the CMTS knows when data is expected to arrive at the CM and can plan its MAP generation accordingly. In certain embodiments, the LTE subframe numbering and the DOCSIS upstream minislot numbering may be synchronized to achieve this end. It should be noted that the CM grant may be wasted if UL data is not received correctly on the LTE side. As described above, the present system and method may be applied to any backhaul system utilizing REQ-GNT processes, and cable/DOCSIS embodiments are discussed here for exemplary purposes only and to simplify the description.

It will be noted that on the LTE side, there may be transactions (SRs, BSRs) during the same LTE subframe from the multiple active UEs a single SC may be serving, all wishing to send UL traffic. In one embodiment, each LTE transaction (i.e., BSR) is mapped to a single DOCSIS transaction (i.e., REQ-GNT loop). In a more likely scenario, a BWR will aggregate LTE transactions. Additionally, for scenarios in which multiple SCs are attached to a single CM, when the CMTS to which the CM is connected snoops the session setup messages, as described above, the CMTS should know the number of SCs connected to the CM. Assuming one BWR per SC for each BWR interval, the CMTS can allocate bytes to send multiple BWRs for the corresponding number of SCs for the CM. Alternatively, the CM may aggregate multiple BWRs into a single BWR. This means the CM treats the BWR as a DOCSIS MAC Management Message and must interpret it, rather than treating it as a data packet when forwarding it upstream to the CMTS. Additionally and/or alternatively, the number of SCs attached to a CM may be manually configured on the CMTS, as this number is likely static.

Figure 8:
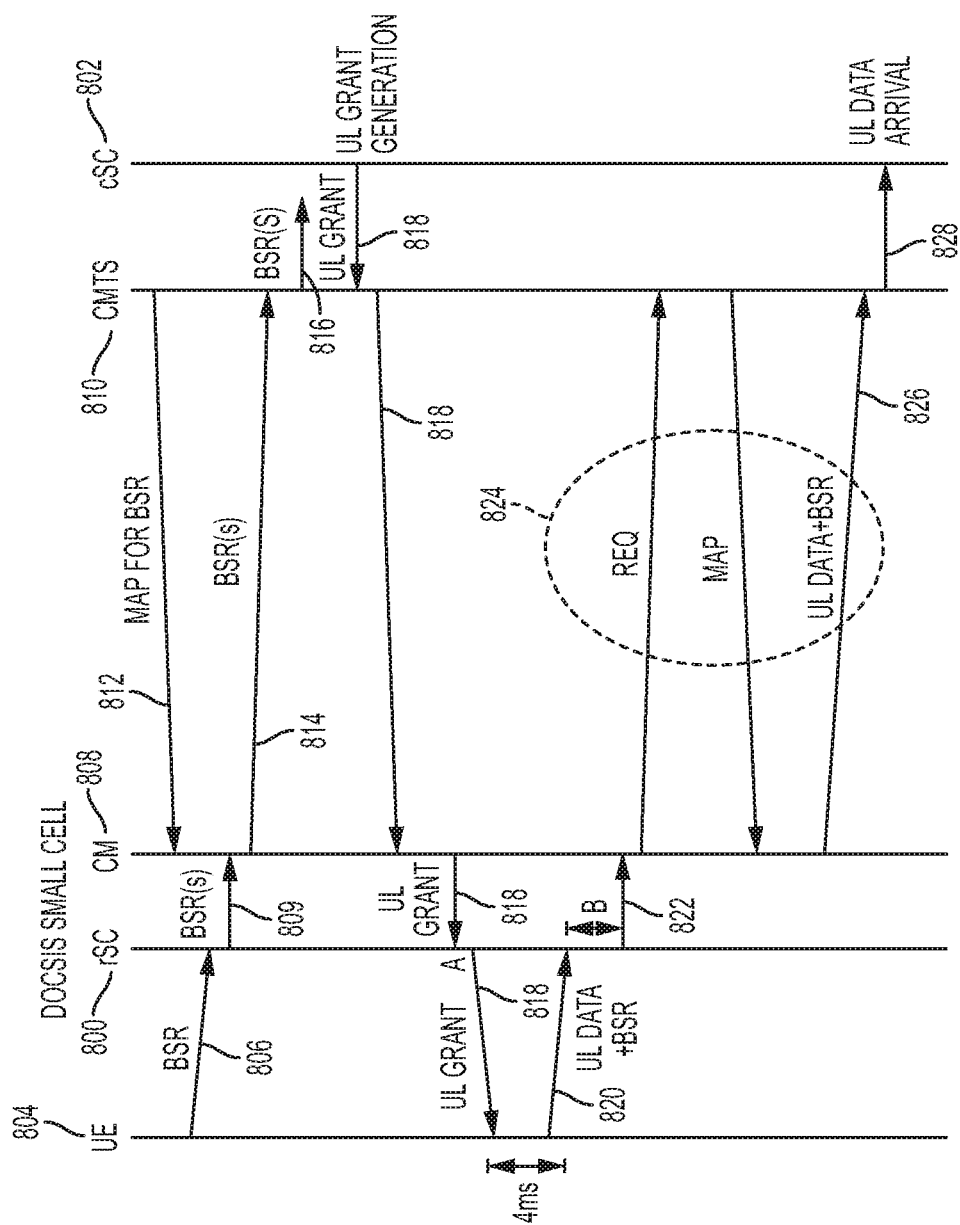
FIG. 8 is a signaling diagram illustrating LTE and DOCSIS request-grant processes in a DSC system having a split SC in accordance with embodiments described herein.

Referring now to FIG. 8, in a system comprising a split SC that includes an rSC 800 and a cSC 802, when UL data is available for transmission, UE 804 sends a BSR 806 to the rSC 800, which forwards the BSR to a CM 808 (along with other BSRs from other UEs), as represented by an arrow 809. A CMTS 810 periodically polls the CM 808 for BSRs via MAPs, such as MAP 812. At the time indicated in the MAP 812, CM 808 forward the BSR(s) to CMTS 810, as represented by an arrow 814. CMTS 810 forwards the BSRs to cSC 802, as represented by an arrow 816. The cSC 802 generates a UL grant back to UE 804, as represented by arrows 818.

The UL grant 818 sent by the cSC 802, is propagated by the CMTS 810, the CM 808, and the rSC 800. Upon receipt of the UL grant 818, UE 804 forwards UL data along with a BSR (if any) to the rSC 800 at the time indicated in the UL grant, as represented by an arrow 820. The UL data/BSR are forwarded to CM 808, as represented by an arrow 822, at which point, the CM initiates a REQ/GNT loop 824 with the CMTS, the result of which is the forwarding of UL data/BSR to the CMTS 810 (arrow 826) and ultimately arrival of UL data at cSC 802 (arrow 828).

Figure 9:
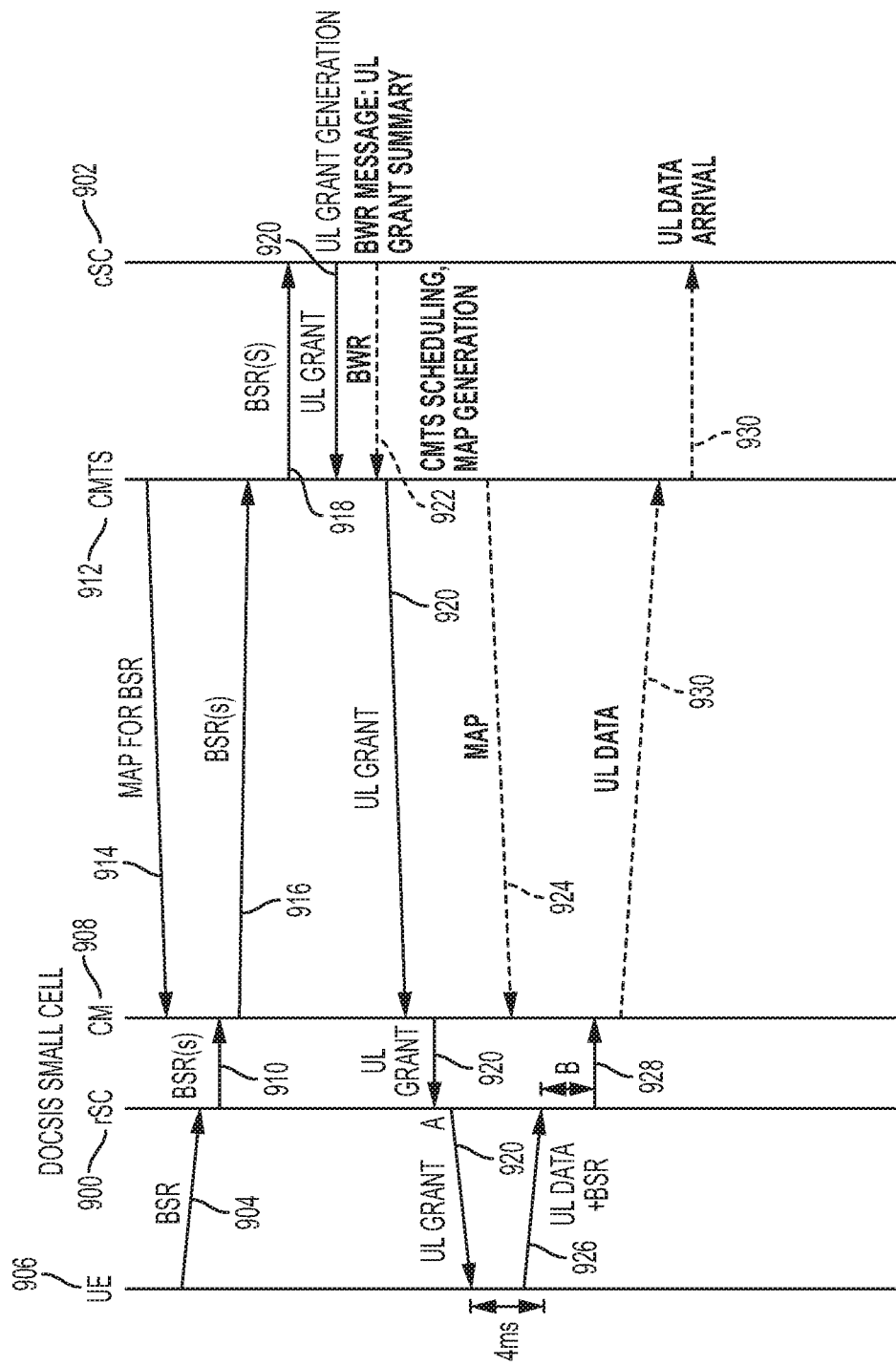
FIG. 9 is a signaling diagram illustrating techniques for pipelining LTE and DOCSIS requests in accordance with features of embodiments described herein comprising a split SC.

FIG. 9 is a signaling diagram illustrating techniques for pipelining LTE and DOCSIS requests in accordance with features of embodiments described herein comprising a split SC. As shown in FIG. 9, in a system comprising a split SC that includes an rSC 900 and a cSC 902, upon receipt at rSC 900 of a BSR 904 from a UE 906, the rSC 900 forwards the BSR (along with other BSRs from other UEs) to a CM 908, as represented by an arrow 910. A CMTS 912 periodically polls the CM 908 for BSRs via MAPs, such as MAP 914. At the time indicated in the MAP 914, CM 908 forward the BSR(s) to CMTS 912, as represented by an arrow 916. CMTS 912 forwards the BSRs to cSC 902, as represented by an arrow 918, which generates a UL grant back to UE 904, as represented by arrows 920. Additionally, a bandwidth report builder either residing on the cSC 902 or between the CMTS and the cSC intercepts the grant information from the LTE scheduler and constructs a BWR 922 that describes the number of required bytes required per QoS class (e.g., data, voice, signaling). Alternatively, the BWR 922 may be a bulk grant that aggregates bytes expected in all QoS classes. The BWR 922 is sent from the cSC 902 to the CMTS 912. Upon receipt of the BWR, CMTS 912 uses the information provided in the BWR to generate an upstream grant ("MAP") to the CM 908 sized and timed to forward the expected amount of data at the expected time as described in the BWR, as represented by an arrow 924.

Upon receipt of the UL grant 920, UE 904 forwards UL data/BSR to the rSC 900 at the time indicated in the UL grant, as represented by an arrow 926. The UL data/BSR are forwarded to CM 908, as represented by an arrow 928, just before the scheduled transmission time indicated in the MAP 924. The CM 908 forwards the UL data to the CMTS 912, which forwards it to the cSC 902, as represented by arrows 930, at the time indicated in the MAP 924. Using the pipelining enabled by the BWR, UL data may be sent to the CMTS significantly more quickly than in the embodiment illustrated in FIG. 8.

As previously mentioned, in certain embodiments, in order for the BWR to be able to reference future granting events, all schedulers must have the same sense of time. In one embodiment, this is done by referencing all schedulers to an IEEE 1588 clock. This is generally conventional for an eNB and may be derived from a 1588 clock on its backhaul Ethernet. A standardized DOCSIS 3.1 a mechanism called DOCSIS Time Protocol ("DTP") allows an IEEE 1588 clock to be transferred through DOCSIS rather than over the top. In general, a time stamp is derived from a central clock and the CMTS/DOCSIS scheduler is synchronized with it. At that point, DOCSIS Time Protocol ("DTP") is used to distribute the timestamp across the DOCSIS system to the cable modem and the cable modem generates a 1588 time stamp using DTP as a reference on the Ethernet network that runs to the eNB. In this manner, both systems may be synchronized to a common clock. In situations in which the DOCSIS system cannot supply the 1588 clock or if the DTP system needs additional correction, the NID may be used to inject the 1588 clock.

In particular, in a split SC scenario, the LTE rSC and LTE scheduler are synced at subframe number level. When the LTE scheduler sends a BWR, it only includes the LTE subframe number. Even though the CMTS is synced to the LTE system, it has no notion of LTE subframe number; therefore, the CMTS doesn't know UL grant time. In response, in one embodiment, the LTE scheduler includes a timestamp of either current time, or future UL grant time in the BWR. Alternatively, the LTE scheduler includes in the BWR:

$$\text{delta } T = UL \text{ grant time-current time, or delta subframe number.}$$

A translation function is required on the CMTS to translate the IEEE 1588 timestamp to the DOCSIS minislot number. Once the CMTS knows the LTE UL grant time in the form of DOCSIS minislot number, CMTS needs to compute the earliest time the DOCSIS grant should be scheduled to transfer the LTE data at the CM. In an embodiment in which the LTE MAC scheduler resides in a central location (i.e., at the cSC) with an R-PHY deployment for cable, the earliest DOCSIS scheduled grant at a CM for UL data may be calculated as: UL grant arrival at CMTS+DOCSIS DS delay+rSC encoding time for UL grant (A)+UE processing time+rSC decoding time for UL data (B)+CM lead time. rSC encoding time for UL grant is approximately equal to 1 ms for LTE framing. rSC decoding time for UL data is approximately equal to 2 ms. UE processing time is approximately equal to 4 ms.

A challenge is presented by HARQ, which adds bandwidth requirements that need accommodation. HARQ is a technique that enables faster recovery from errors in cellular networks by storing corrupted packets in the receiving device rather than discarding them. Using HARQ, even if retransmitted packets have errors, a good packet can be derived from the combination of corrupted ones. The DOCSIS scheduler/policy engine should also take into account timing of the LTE grant to allow for propagation of the data through the system.

It will be recognized that the BWR itself has to go through DOCSIS system and is therefore subject to latency; therefore, by the time the report is received at the CMTS, transactions reported therein may already have occurred. As a result, portions of the BWR may be used to predict future behavior. For example, of some number (e.g., 20) of transactions have been missed, it may be assumed that the same number of similar transactions may be missed in the future. In this manner, the BWR (or a series of BWRs) may be used to predict a pattern of transactions (or grant requests) over time. Other information conveyed by the BWRs with regard to the types of transactions listed therein may also be used to perform predictive scheduling.

Embodiments described herein may support a common form of BWR for a variety of technologies or may support technology-specific BWR formats (e.g., an LTE BWR, a Wi-Fi BWR, a PON access report) and are especially applicable to the next generation of Wi-Fi, is anticipated to deploy an LTE-type scheduler. Further, the pipeline could include more than two stages, such as LTE to DOCSIS R-PHY to Passive Optical Network ("PON").

One aspect of embodiments described herein includes techniques for backhauling HARQ retransmissions with low latency. In particular, techniques described herein will significantly reduce the latency involved for HARQ retransmissions. Techniques described herein include system and method to estimate latency on the backhaul to allow for just-in-time HARQ feedback transmission by an LTE scheduler at a cSC to enable backhauling over DSC architecture.

Figure 10:
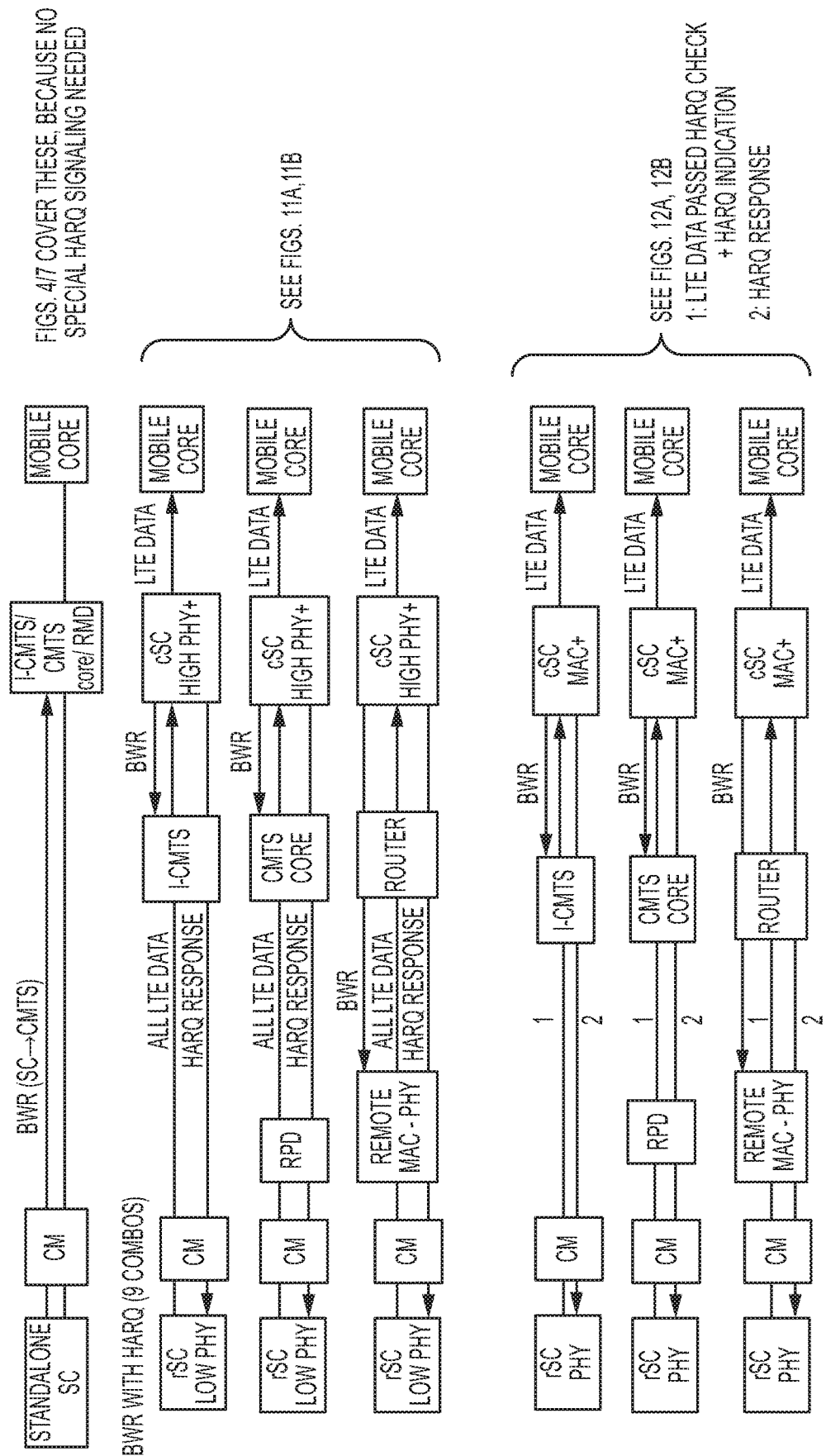
FIG. 10 illustrates simplified block diagrams illustrating architectural combinations of split SC and split DOCSIS, and for each combinations, how HARQ is treated when pipelining techniques is implemented.
Figure 10:
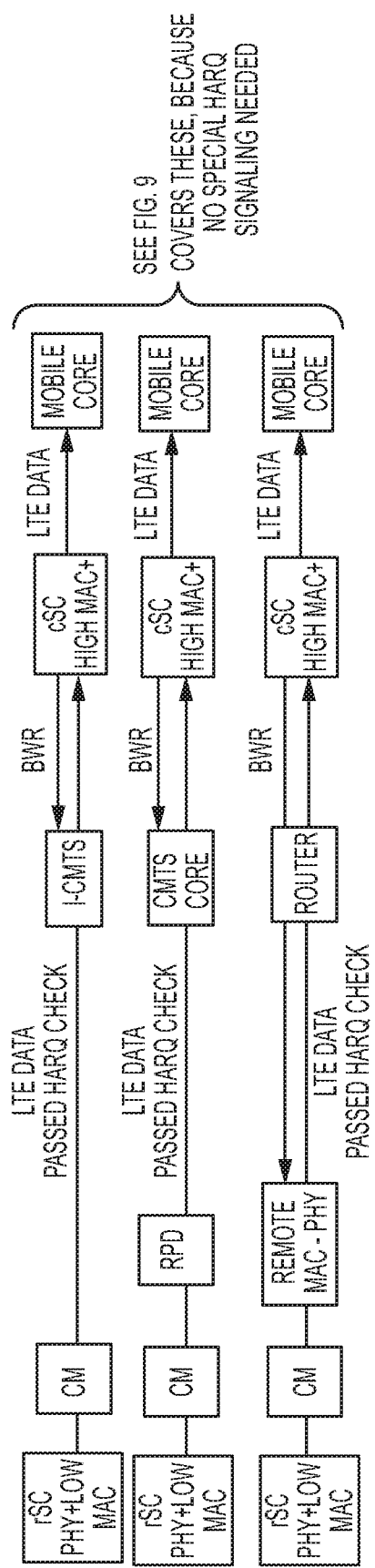

FIG. 10 illustrates simplified block diagrams illustrating architectural combinations of split SC and split DOCSIS, and for each combination, how HARQ is treated when pipelining techniques is implemented.

Figure 11A:
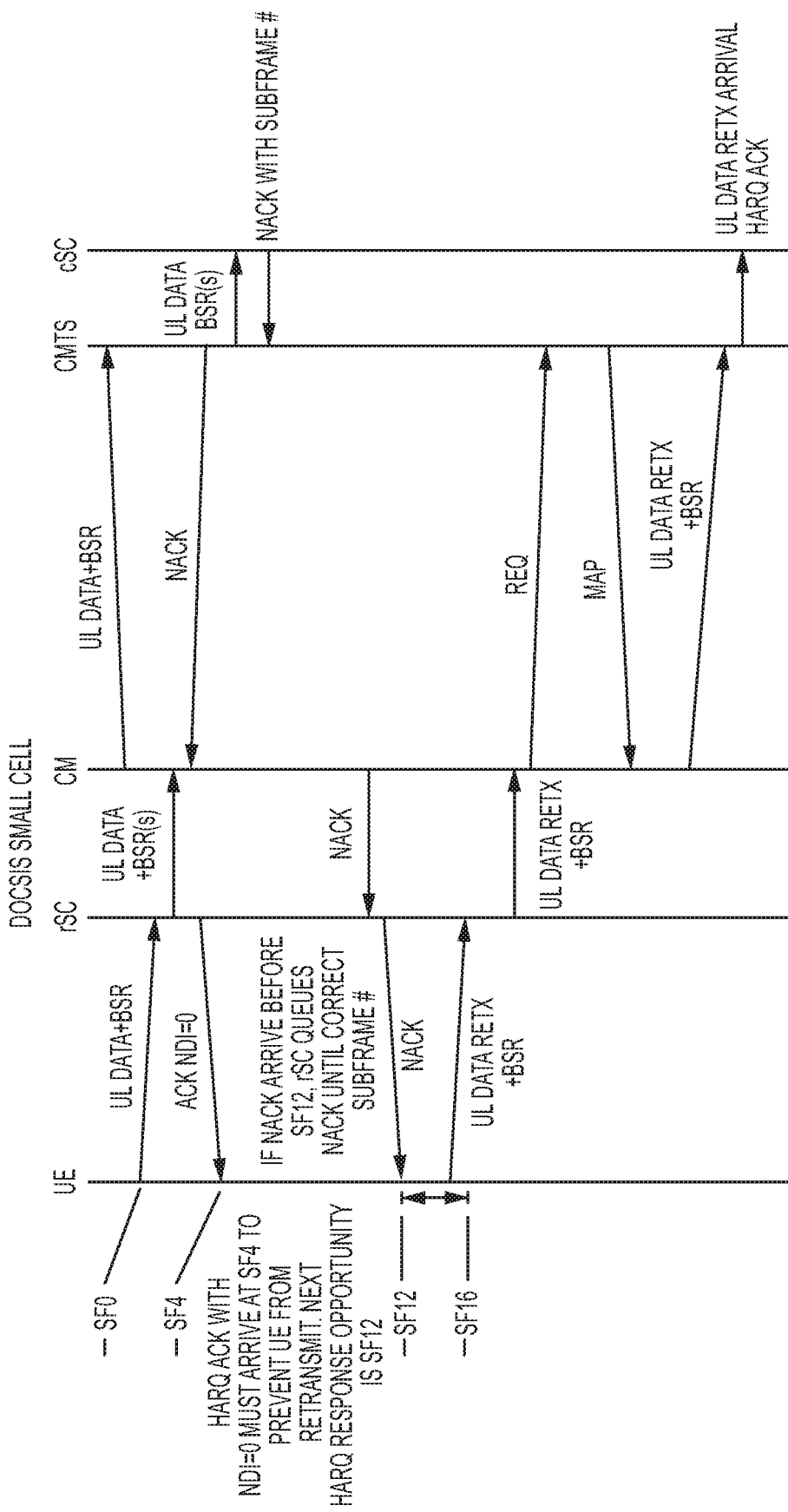
FIG. 11A is a signaling diagram illustrating HARQ retransmissions in an intra-PHY split SC embodiment of a DSC system.
Figure 11B:
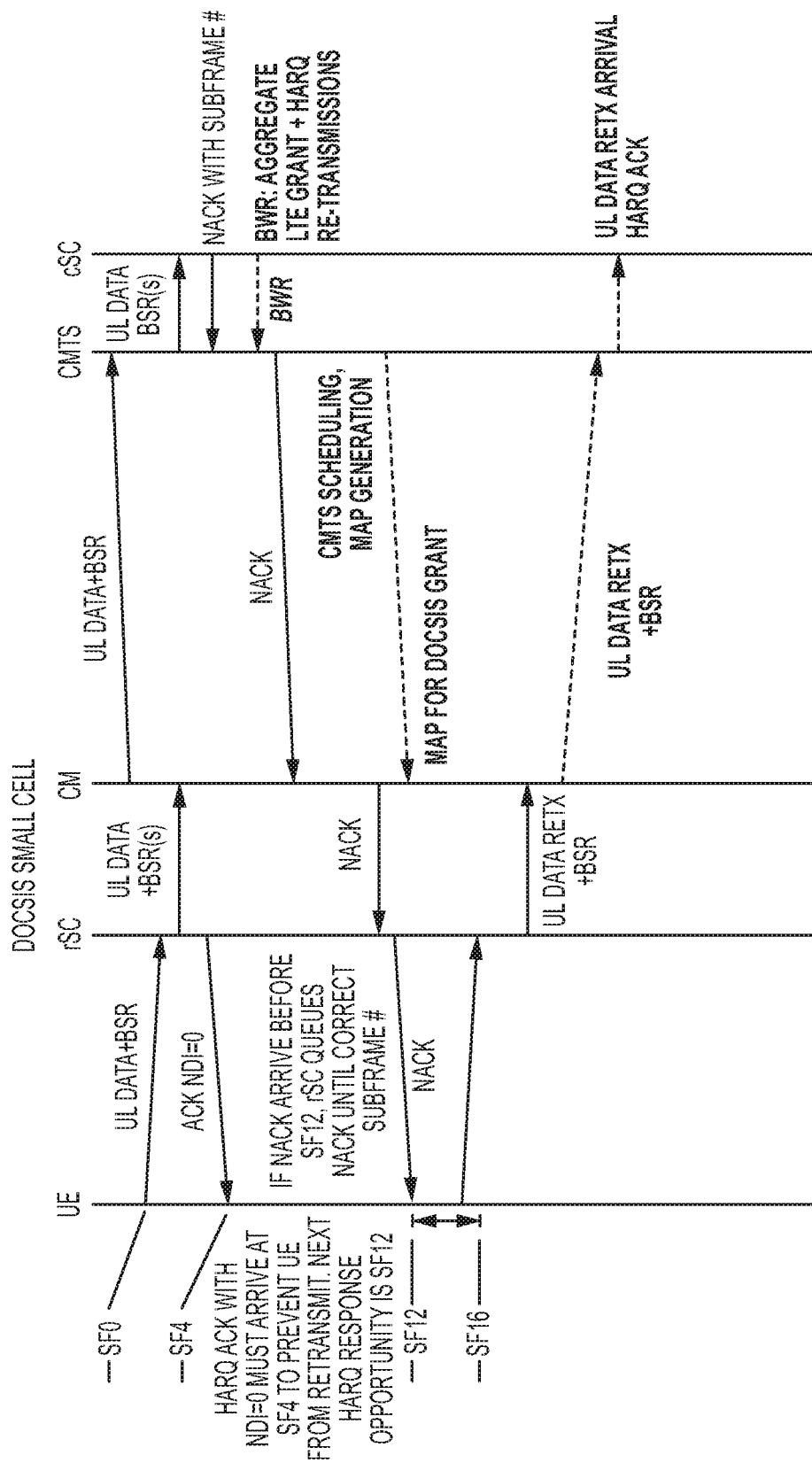
FIG. 11B is a signaling diagram illustrating HARQ retransmissions in an intra-PHY split SC embodiment of a DSC system in which pipelining of the LTE and DOCSIS requests is accomplished using a BWR in accordance with embodiments described herein.

FIG. 11A is a signaling diagram illustrating HARQ retransmissions in a split SC embodiment of a DSC system. FIG. 11B is a signaling diagram illustrating HARQ retransmissions in a split SC embodiment of a DSC system in which pipelining of the LTE and DOCSIS requests is accomplished using a BWR in accordance with embodiments described herein.

Figure 12A:
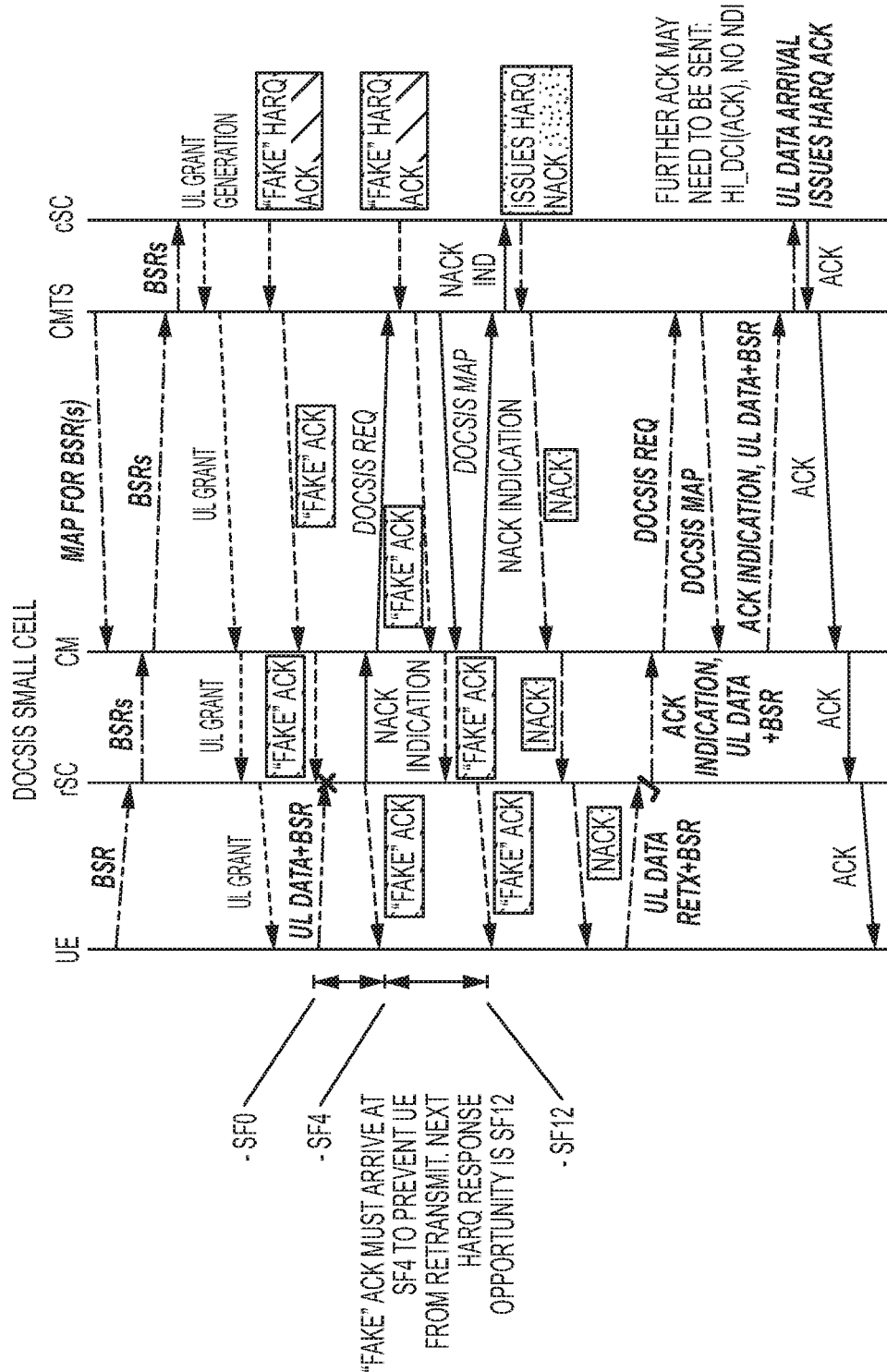
FIG. 12A is a signaling diagram illustrating HARQ retransmissions in a PHY-MAC split SC embodiment of a DSC system.
Figure 12B:
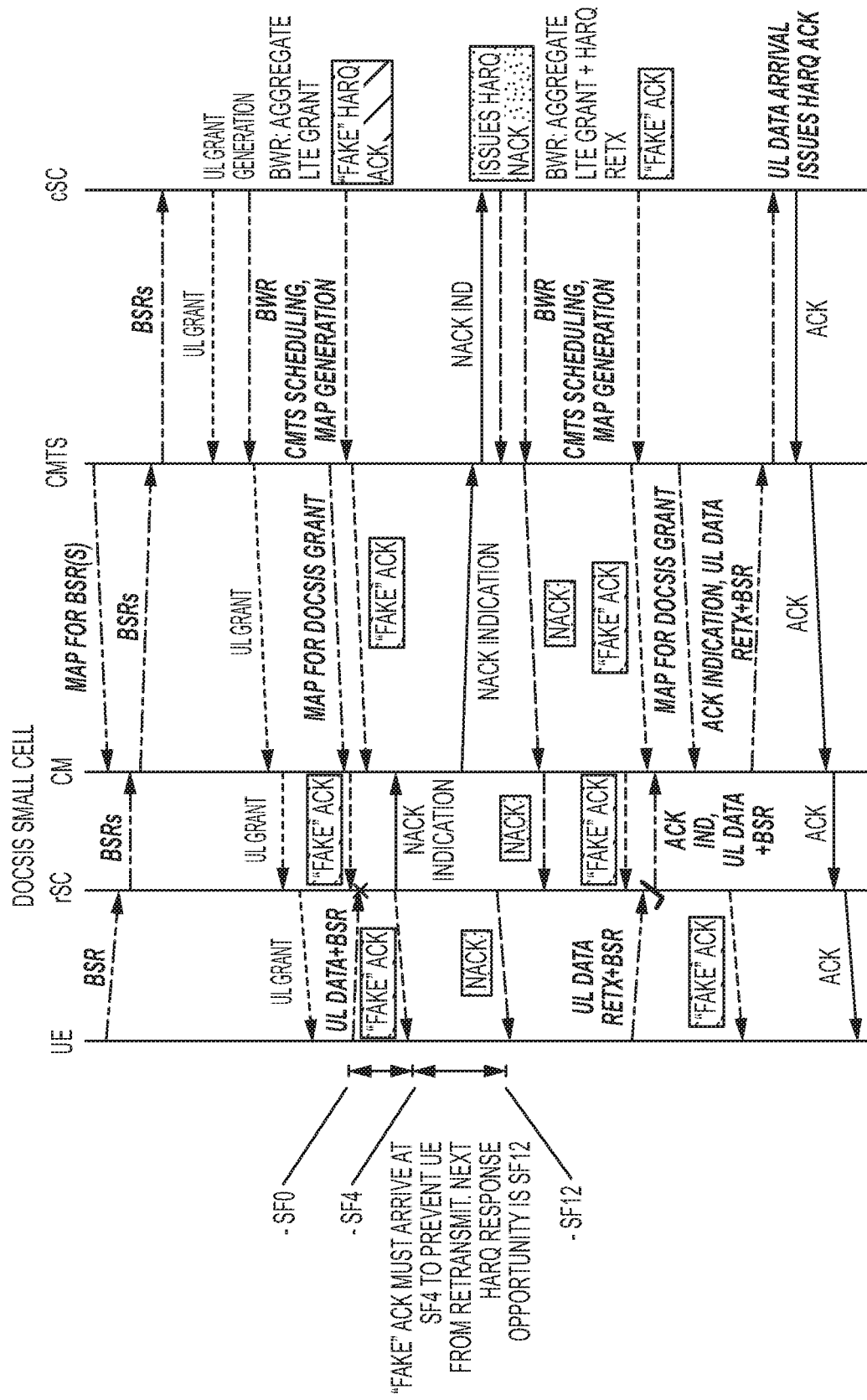
FIG. 12B is a signaling diagram illustrating HARQ retransmissions in a PHY-MAC split SC embodiment of a DSC system in which pipelining of the LTE and DOCSIS requests is accomplished using a BWR in accordance with embodiments described herein.

FIG. 12A is a signaling diagram illustrating HARQ retransmissions in another split SC embodiment of a DSC system. FIG. 12B is a signaling diagram illustrating HARQ retransmissions in another split SC embodiment of a DSC system in which pipelining of the LTE and DOCSIS requests is accomplished using a BWR in accordance with embodiments described herein.

Figure 13A:
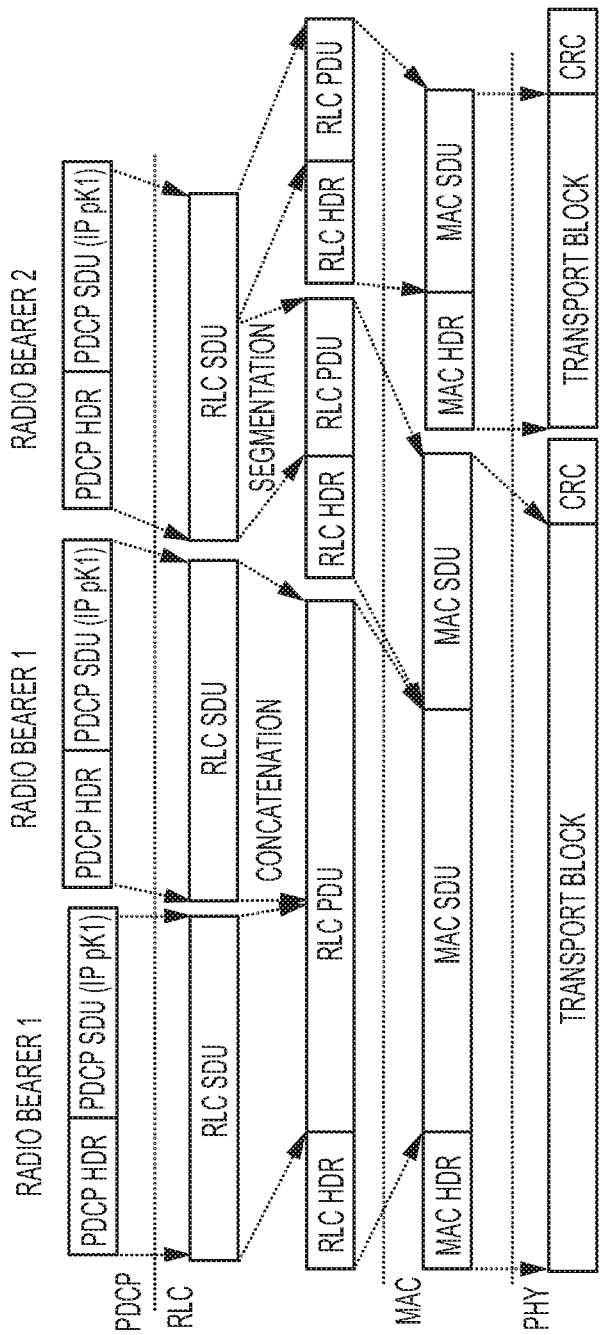
FIG. 13A is a simplified block diagram illustrating UL data plane packet segmentation in accordance with embodiments described herein.

It will be recognized that in LTE UL transmission, packet segmentation may occur due to eNB unable to grant what is requested by the UE in full. Since BSR does not report packet boundaries, partial grant may result in a packet being segmented and sent in separate grants. When segmentation occurs, the eNB buffers the segment(s) and does not egress the packet to the CM until it is received in full. Since the BWR describes the amount of data that should be expected to egress the eNB and arrive at the CM at a precise time, a partial grant may result in a mismatch between the LTE data actually egressed and the amount that is expected as predicted by the BWR. FIG. 13A illustrates UL data plane packet segmentation in accordance with embodiments described herein.

With regard to segmentation at the LTE RLC sublayer, after receiving a grant in bytes, the UE fills the transport block ("TB") with Radio Link Control ("RLC") Packet Data Units ("PDUs"). RLC PDU size is based on TB size. If an RLC Service Data Unit ("SDU") is large, or the available radio data resource in low (resulting in smaller TB size), the RLC SDU may be split among several RLC PDUs. This is referred to as "segmentation." If the RLC SDU is small, or the available radio data resource is high, several RLC SDUs may be packed into a single PDU. This is referred to as "concatenation." In view of the foregoing, it is recognized that an IP packet may be segmented and transported in more than one subframe. eNB buffers partial segments of Packet Data Convergence Protocol ("PCDP") packets until they are received in full, then send complete PDCP/IP packets to the egress queue, which is then sent to the CM. It will be noted that the UE fills the grant with the highest priority Logic Channel ("LC") first. Additionally, there is 1:1 mapping from Dedicated Radio Bearer ("DRB") to LC, one RLC entity per LC. Each RLC entity creates RLC PDUs. LC to LCG mapping is performed at DRB setup.

Figure 13B:
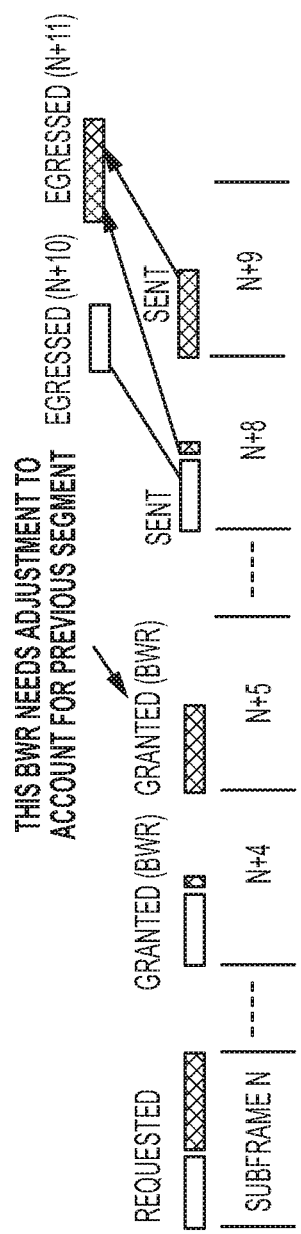
FIG. 13B is a simplified block diagram of BWR adjustment in accordance with features of embodiments described herein.

FIG. 13B is a simplified block diagram of BWR adjustment in accordance with features of embodiments described herein. As shown in FIG. 13B, the eNB buffers partial packets until the remaining segment is sent in a future grant. There needs to be sufficient DOCSIS grant to account for the previous segment so that the entire packet can be sent when it egresses from the eNB. There are several solutions to accomplish this. In one solution, eNB adds additional bytes to BWR or CMTS granting additional bytes in DOCSIS grants. In a simplified brute force adjustment, the eNB adds up to maximum packet size such as 1518 bytes to the BWR for each active UE for each BWR reporting period. Alternatively, the CMTS can perform the adjustment. In a worst case scenario, DOCSIS grant overage is 12 Mbps per active UE.

When the eNB performs reassembly of an IP packet due to the fragmentation in the UE, additional latency is introduced in the eNB. If the latency build up is too great, it may delay the IP packets enough that they will not arrive in the CM upstream buffer in time to use the grant that the CMTS has sent in accordance with the BWR. In another solution, it is assumed that most or all latencies are N number of LTE sub-frames or less. N is typically one or two. The grant at the CM is then delayed on average by that amount of time. In such a system, the CMTS will calculate when it thinks the IP packets should arrive at the CM and then issue grants at a later time. Thus, there will be buffering time in the CM that can absorb the latency caused by the reassembly operation in the eNB. The typical buffering in the CM by system design may be 1 to 5 ms.

Alternatively, the CMTS will issue grants to the CM aggressively to achieve minimum latency and then issue additional CMTS grants to compensate for the unused CMTS grants. To keep track of the unused bytes, the eNB should include in the BWR a report of the number of bytes from IP packets that were delay and the amount of time they were delayed in the reassembly engine. This report can take the shape of bytes in and bytes out every subframe time. In this manner, the reassembly engine is acting like a FIFO where all bytes come in eventually come out, and the difference between the input and output times represents on going latency and number of bytes. Alternatively, the CMTS can look at its CMTS receiver circuit and measure the amount of unused bytes in the received grants and re-issue that number of bytes plus some amount of headroom. The amount of headroom can be configurable as an absolute amount, a percentage amount, or a heuristic amount based upon a predictive algorithm. For example, the algorithm may choose to ignore reassembly delays of less than X ms (e.g., 2 ms) and then multiple the number of bytes delayed in the reassembly engine above 2 ms by 120% to provide 20% headroom.

Figure 14:
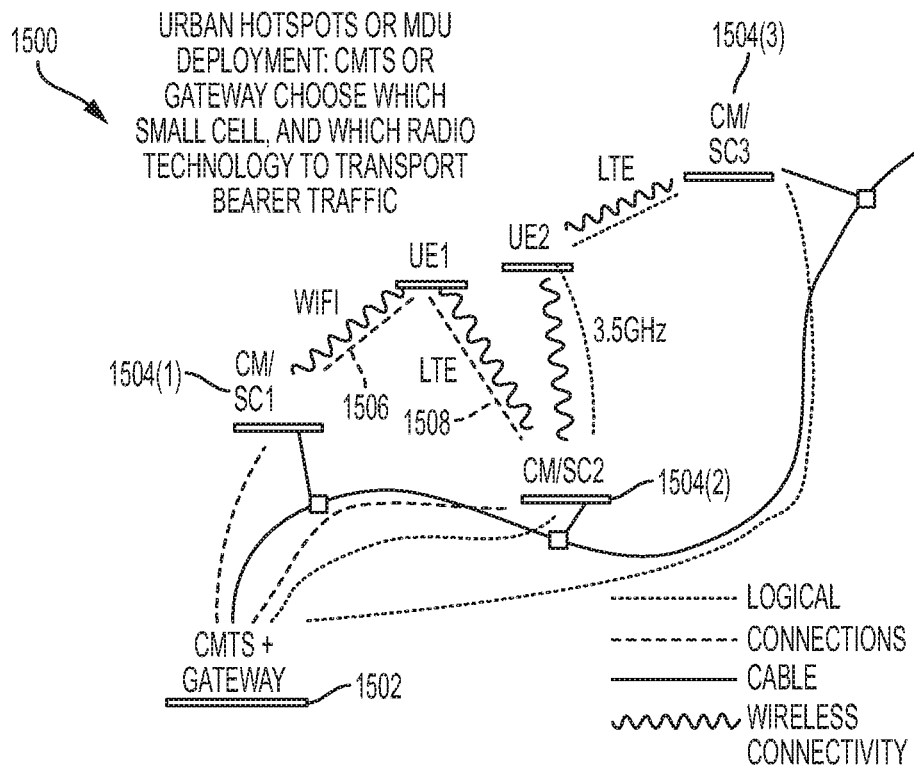
FIG. 14 is a simplified block diagram illustrating a technique for dynamic traffic steering in a communications network in accordance with embodiments described herein.

FIG. 14 is a simplified block diagram illustrating a technique for dynamic traffic steering in a communications network 1500 in accordance with embodiments described herein. The network 1500 illustrated in FIG. 14 may correspond to an urban hotspot or MultiDwelling Unit ("MDU") deployment in which a CMTS with gateway 1502 chooses which one of a plurality of DOCSIS small cells ("DSCs" or "CM/SCs"), illustrated in FIG. 14 as DSCs 1504(1), 1504(2), and 1504(3) and which radio technology on which to transport bearer traffic for UE1 and UE2. A primary goal of the illustrated technique is to make best use of all spectrum resources via intelligent traffic steering. As shown in FIG. 14, UE1 has an ongoing data session on DSC 1504(1) via a Wi-Fi connection 1506. It will be assumed for the sake of example that UE1 then initiates a new video calling session. CMTS 1502 has knowledge of the traffic QoS requirements, network conditions (e.g., congestion on the Wi-Fi connection 1506 and underutilization of an LTE connection 1508), UE1 capability and UE1-to-DSC mapping. Based on this information, the CMTS 1502 can steer the new session onto the LTE radio of CM/SC2 1504(2). CMTS may also aggregate traffic on LTE and Wi-Fi links.

In an alternate embodiment for traffic steering of LTE traffic over DOCSIS, the CMTS may require a new flow or bearer definition. Currently, a DOCSIS Service Flow (SF) defines a flow or connection from the CMTS to the CM. In this embodiment, it would use a Mobile Flow (MF) that is from a CMTS to UE. This is because the CMTS switches packets based on the IP address of the packets and must pick a destination path when switching. The destination path now in a CMTS is a SF. The MF would be a constant connection that could then be mapped to different SFs. A table could be built on which SF to use. Since the MF can change paths, one MF would map to one of multiple SFs. The method to populate this table of SFs can be from either snooping of LTE traffic or through interaction with the mobile policy and/or OSS systems. For aggregating multiple links, there could be two MF active for a single UE, and a learning algorithm on the CMTS would learn the IP address of each UE flow from the upstream link and then assign a forwarding path in the CMTS downstream path to steer packets to the correct MF. This learning algorithm would be run dynamically. It would be based on at least IP DA/SA pairs. A flow in the upstream with IP DA=X would be used to create a route in the downstream for IP SA=X. This is a form of policy based routing.

Figure 15A:
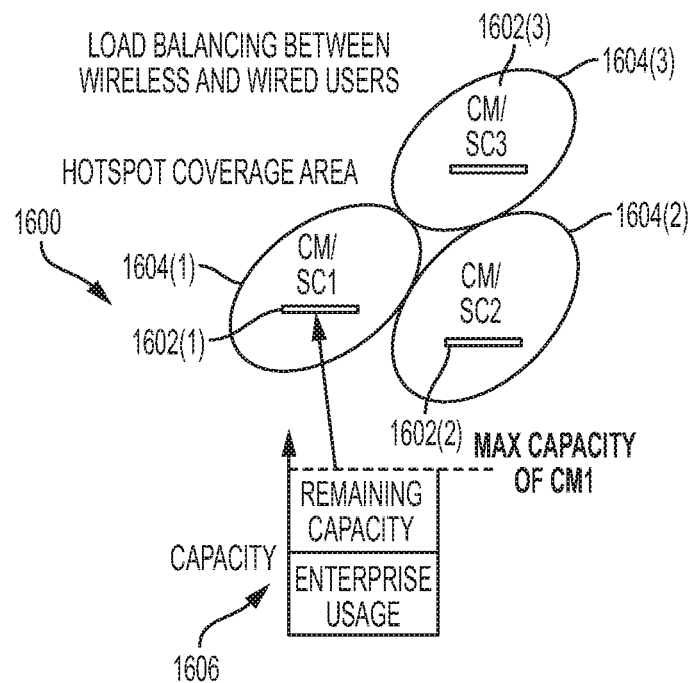
FIGS. 15A and 15B are simplified block diagrams illustrating techniques for load balancing among a number of DOCSIS integrated small cells by expanding or shrinking cell sizes thereof in accordance with embodiments described herein.
Figure 15B:
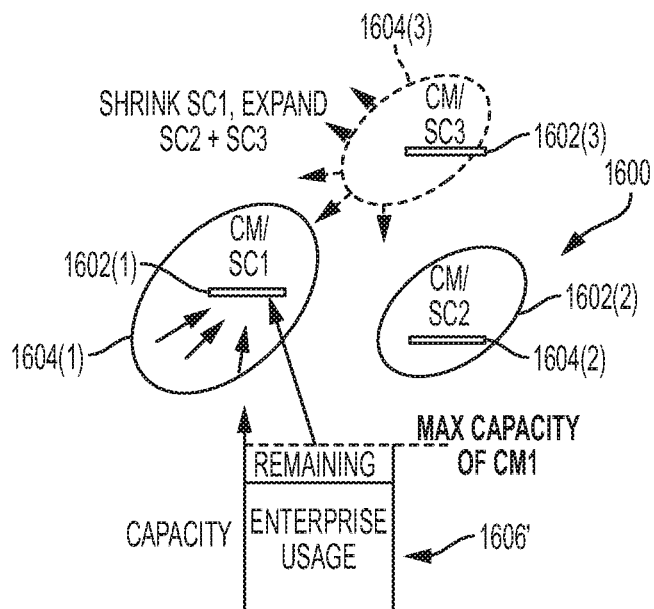

FIGS. 15A and 15B are simplified block diagrams illustrating a technique for dynamic small cell resizing in a network 1600 comprising three DSCs 1602(1), 1602(2), and 1602(3) each having a respective cell size 1604(1), 1604(2), and 1604(3) associated therewith. Small cell deployments may be capable of expanding and shrinking in cell size depending on traffic demands and other factors via transmit power adjustments. Depending on the number and identity of users being served by a CM in a DSC, unused, or remaining, capacity of a DSC can vary over time. In certain embodiments, a CMTS connected to the DSCs balances remaining capacity among the CMs supporting the small cells by expanding or shrinking the size of each cell while maintaining overall coverage continuity. FIG. 15A illustrates load balancing among cell sizes of DSCs 1602(1), 1602(2), and 1602(3), such that, as represented in a graph 1606, less than 50% of the total capacity of the CM of DSC 1602(1) is being used. Referring now to FIG. 15B, upon detection that the utilization of the CM of DSC 1602(1) has grown to close to maximum capacity, as represented in a graph 1606', the CMTS shrinks the cell size 1604(1) of DSC 1602(1) and expands the cell sizes 1604(2), 1604(3) of DSCs 1602(2), 1602(3), to balance capacity among the DSCs while maintaining overall coverage continuity in the network 1600. To accomplish this, signaling is required. Signaling can either between the CMTS and the Small Cells, or between a separate management and each of the small cell entities.

Figure 16A:
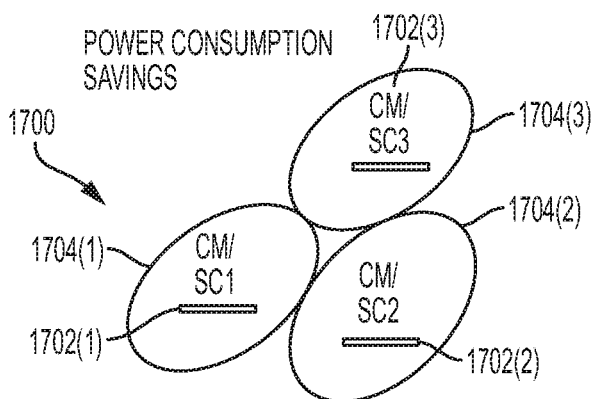
FIGS. 16A and 16B are simplified block diagrams illustrating a technique for controlling power consumption in a network including a number of DOCSIS integrated small cells in accordance with embodiments described herein.
Figure 16B:
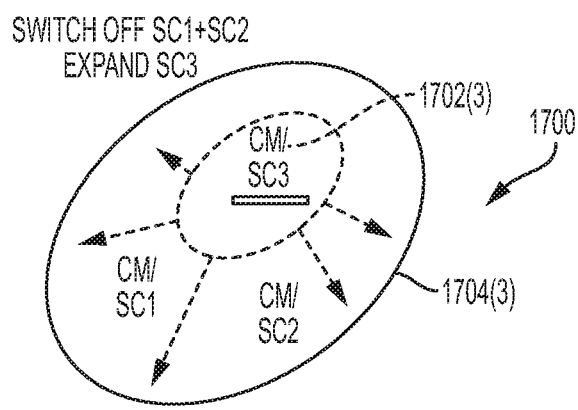

FIGS. 16A and 16B are simplified block diagrams illustrating a technique for controlling power consumption in a network 1700 comprising three DSCs 1702(1), 1702(2), and 1702(3) each having a respective cell size 1704(1), 1704(2), and 1704(3) associated therewith, in accordance with embodiments described herein. In certain embodiments, during times of low load, one or more of the DSCs 1702 (1)-1702(3) are switched off (meaning their respective cell sizes 1704(1)-1704(3) shrink to zero), while another one or more of the DSCs are expanded to accommodate the capacity of the one or more DSCs that have been switched off. FIG. 16A illustrates a state of the network 1700 when all of the DSCs 1702(1)-1702(3) are on. FIG. 16B illustrates the state of the network 1700 when DSCs 1702(1) and 1702(2) have been switched off (meaning the cell size of each is effectively zero) and the cell size 1704(3) of DSC 1702(3) is expanded to compensate for the reduction in capacity due to the switching off of the other two DSCs.

In particular embodiments, the various components may comprise a software application executing on a specialized hardware appliance (e.g., suitably configured server) with appropriate ports, processors, memory elements, interfaces, and other electrical and electronic components that facilitate the functions described herein. In some embodiments, the various components may execute on separate hardware devices and/or comprise software applications or combination thereof that perform the operations described herein.

Note that although the operations and systems are described herein with respect to a cable network architecture, the operations and systems may be used with any appropriate related network function, including load-balancers, firewalls, WAN accelerators, etc., and the appliances that are associated therewith (e.g., customer premises equipment (CPE), cable modem (CM), etc.)

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, PSM module 24. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, PSM module 24 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors could transform an element or an article (e.g., data, or electrical signals) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication systems described herein may be applicable to other exchanges or routing protocols. Moreover, although communication systems have been illustrated with reference to particular elements and operations that facilitate the communication process, these elements, and operations may be replaced by any suitable architecture or process that achieves the intended functionality of the various communication systems herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed by a termination element, comprising:
   receiving at the termination element of a first network a bandwidth report ("BWR"), wherein the BWR includes information regarding a data transmission opportunity over a second network for at least one endpoint data, wherein the BWR indicates a future bandwidth needed for the data transmission with a forward looking traffic profile comprising a quantity of bytes required at a specific time interval, wherein receiving the BWR comprises receiving the BWR as a unsolicited grant service (UGS) flow, and wherein a maximum BWR packet sending rate is equal to a UGS grant interval;
   scheduling a first network transmission opportunity for the at least one endpoint data using the information derived from the received BWR; and
   receiving from a first network forwarding device the at least one endpoint data in accordance with the scheduled first network transmission opportunity.

2. The method of claim 1, wherein the receiving the BWR occurs prior to an arrival of the at least one endpoint data at the first network forwarding device.

3. The method of claim 1, further comprising transmitting a grant message identifying the scheduled first network transmission opportunity to the first network forwarding device prior to an arrival of the at least one endpoint data at the first network forwarding device.

4. The method of claim 1, wherein the information regarding the at least one endpoint data transmission opportunity over the second network is generated by a scheduler comprising an LTE scheduler from a Buffer Status Report ("BSR") received from the at least one endpoint and wherein the BWR is generated by a BWR builder using at least the information regarding the at least one endpoint data transmission opportunity.

5. The method of claim 1, further comprising processing the BWR at the first network forwarding device to produce a Data over Cable Service Interface Specification ("DOCSIS") REQ message.

6. The method of claim 5, wherein the grant message comprises a Data over Cable Service Interface Specification ("DOCSIS") MAP message.

7. The method of claim 1, wherein the first network comprises a wired communications network and the second network comprises a wireless communications network.

8. An apparatus comprising a termination element of a first network, a processor, and a memory device, wherein the apparatus is configured to:
   receive a bandwidth report ("BWR"), wherein the BWR includes information regarding a data transmission opportunity over a second network for at least one endpoint data, wherein the BWR indicates a future bandwidth needed for the data transmission with a forward looking traffic profile comprising a quantity of bytes required at a specific time interval, wherein receiving the BWR comprises receiving the BWR as a unsolicited grant service (UGS) flow, and wherein a maximum BWR packet sending rate is equal to a UGS grant interval;
   schedule a first network transmission opportunity for the at least one endpoint data using the information derived from the received BWR; and
   receive from a first network forwarding device the at least one endpoint data in accordance with the scheduled first network transmission opportunity.

9. The apparatus of claim 8, wherein the apparatus being configured to receive the BWR comprises the apparatus being configured to receive the BWR prior to an arrival of the at least one endpoint data at the first network forwarding device.

10. The apparatus of claim 8, wherein the apparatus is further configured to transmit a grant message identifying the scheduled first network transmission opportunity to the first network forwarding device prior to an arrival of the at least one endpoint data at the first network forwarding device.

11. The apparatus of claim 8, wherein the information regarding the at least one endpoint data transmission opportunity over the second network is generated by a scheduler comprising an LTE scheduler from a Buffer Status Report ("BSR") received from the at least one endpoint and wherein the BWR is generated by a BWR builder using at least the information regarding the at least one endpoint data transmission opportunity.

12. The apparatus of claim 11, wherein the apparatus is further configured to process the BWR at the first network forwarding device to produce a Data over Cable Service Interface Specification ("DOCSIS") REQ message and wherein the grant message comprises a Data over Cable Service Interface Specification ("DOCSIS") MAP message.

13. One or more non-transitory tangible media that includes code for execution and when executed by a processor is operable to perform operations comprising:
   receiving a bandwidth report ("BWR"), wherein the BWR includes information regarding a data transmission opportunity over a second network for at least one endpoint data, wherein the BWR indicates a future bandwidth needed for the data transmission with a forward looking traffic profile comprising a quantity of bytes required at a specific time interval, wherein receiving the BWR comprises receiving the BWR as a unsolicited grant service (UGS) flow, and wherein a maximum BWR packet sending rate is equal to a UGS grant interval;

scheduling a first network transmission opportunity for the at least one endpoint data using the information derived from the received BWR; and receiving from a first network forwarding device the at least one endpoint data in accordance with the scheduled first network transmission opportunity.

14. The media of claim 13, wherein the receiving the BWR occurs prior to an arrival of the at least one endpoint data at the first network forwarding device.

15. The media of claim 13, wherein the operations further comprise transmitting a grant message identifying the scheduled first network transmission opportunity to the first network forwarding device prior to an arrival of the at least one endpoint data at the first network forwarding device.

16. The media of claim 13, wherein the information regarding the at least one endpoint data transmission opportunity over the second network is generated by a scheduler comprising an LTE scheduler from a Buffer Status Report ("BSR") received from the at least one endpoint and wherein the BWR is generated by a BWR builder using at least the information regarding the at least one endpoint data transmission opportunity.

17. The media of claim 13, wherein the operations further comprise processing the BWR at the first network forwarding device to produce a Data over Cable Service Interface Specification ("DOCSIS") REQ message and wherein the grant message comprises a Data over Cable Service Interface Specification ("DOCSIS") MAP message.

18. The media of claim 13, wherein receiving the BWR as the UGS flow comprises receiving the BWR as the UGS flow at a predetermined interval of a fixed message length, and wherein the predetermined interval is equal to the UGS grant interval of the UGS flow.

19. The method of claim 1, wherein receiving the BWR as the UGS flow comprises receiving the BWR as the UGS flow at a predetermined interval of a fixed message length, and wherein the predetermined interval is equal to the UGS grant interval of the UGS flow.

20. The media of claim 8, wherein receiving the BWR as the UGS flow comprises receiving the BWR as the UGS flow at a predetermined interval of a fixed message length, and wherein the predetermined interval is equal to the UGS grant interval of the UGS flow.

* * * * *